Figure 1:
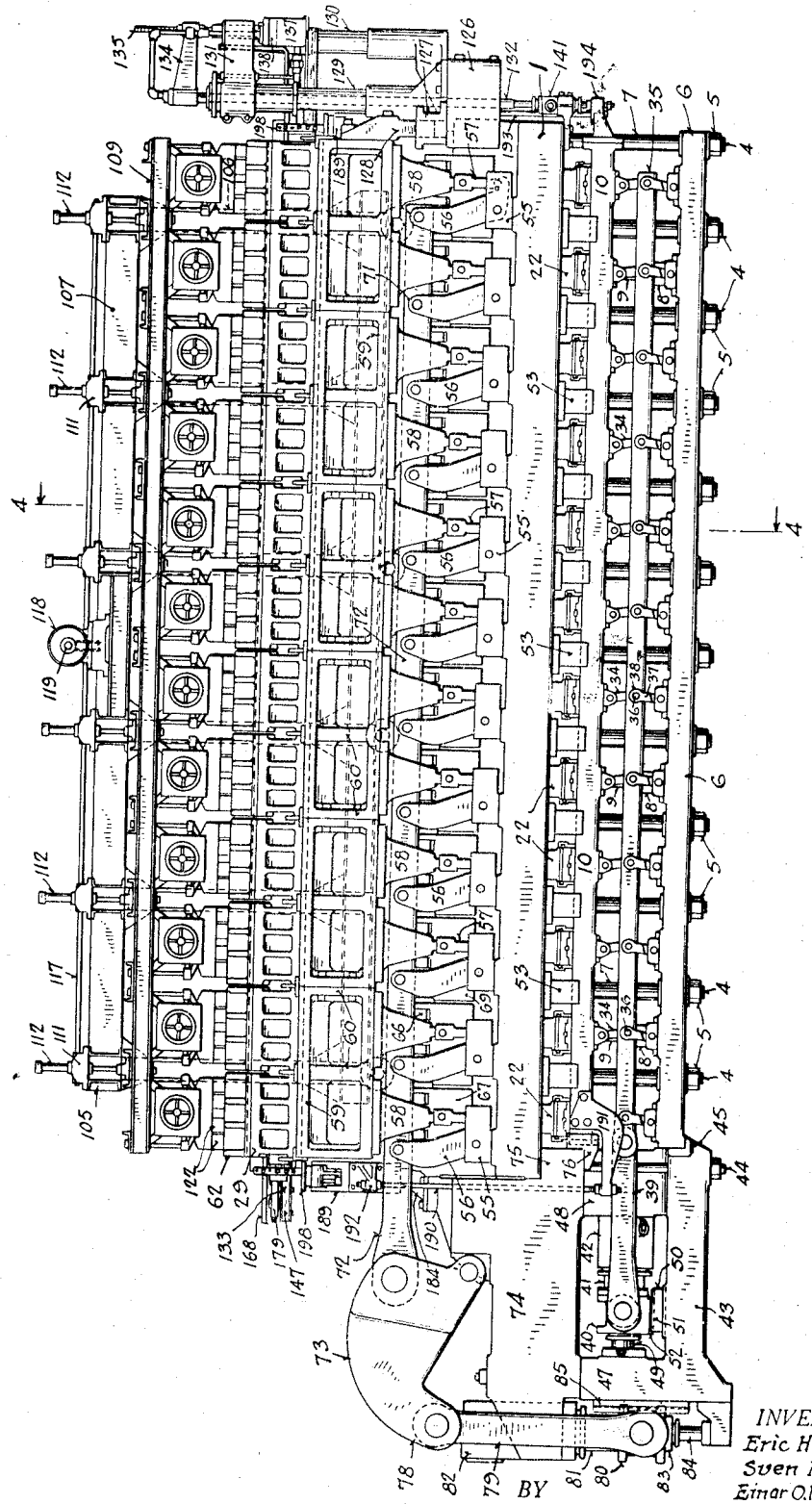

Aug. 23, 1932.  E. NILSON ET AL  1,872,793
FLASH WELDING MACHINE
Filed July 21, 1930   10 Sheets-Sheet 1

INVENTORS:
Eric H. Nilson
Sven Malke
Einar O. Holmberg

BY

ATTORNEY.

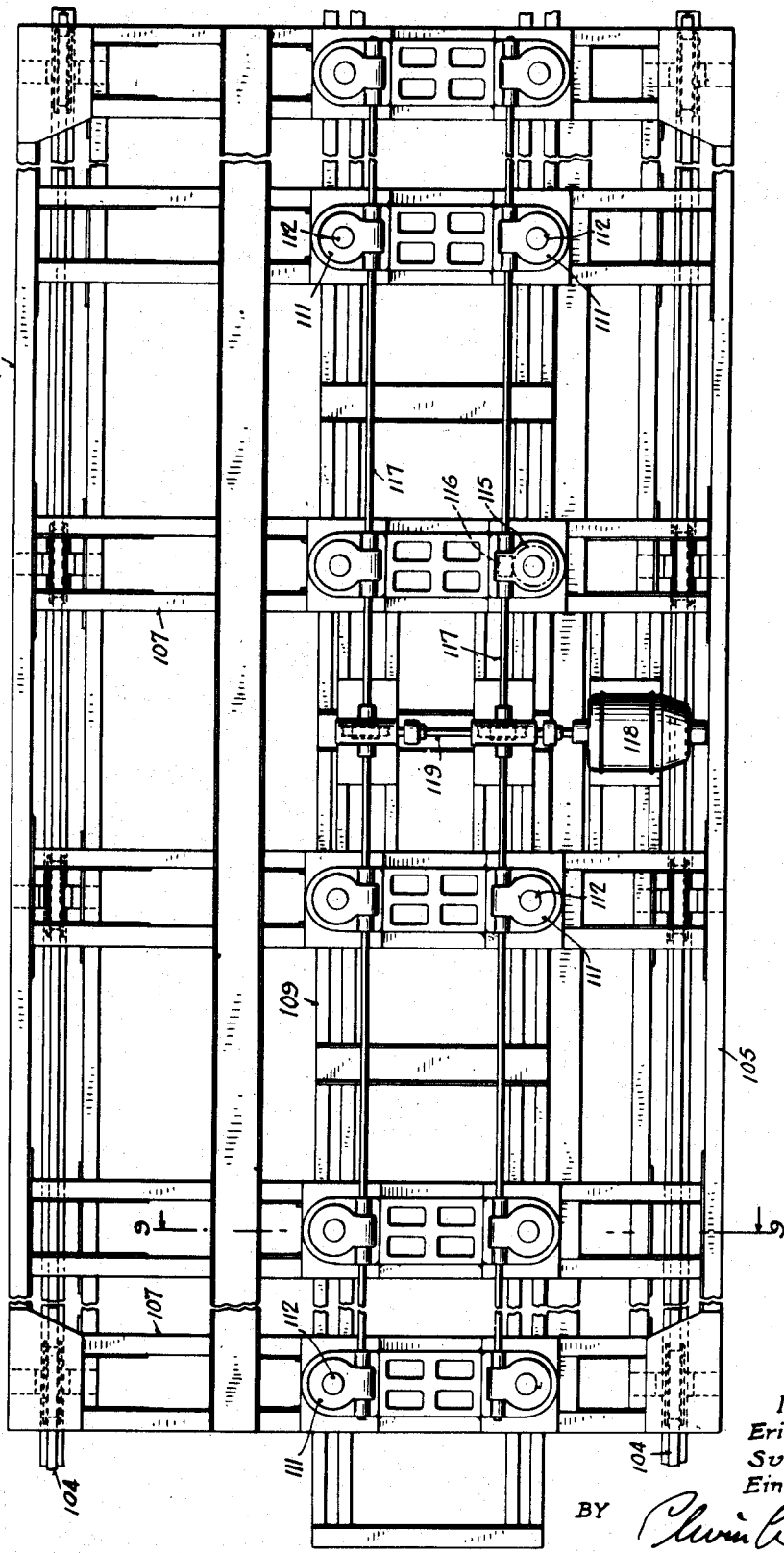

Aug. 23, 1932.　　　E. NILSON ET AL　　　1,872,793
FLASH WELDING MACHINE
Filed July 21, 1930　　10 Sheets-Sheet 8
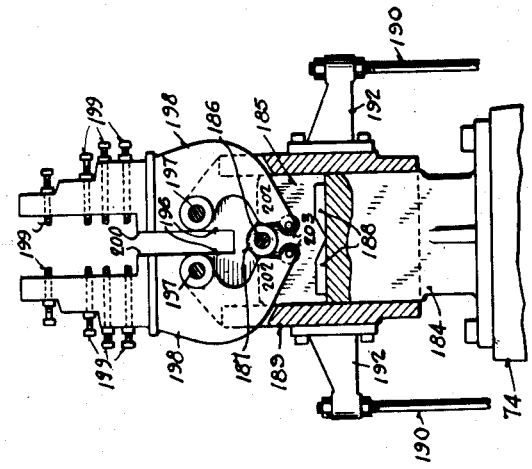
FIG. 10.
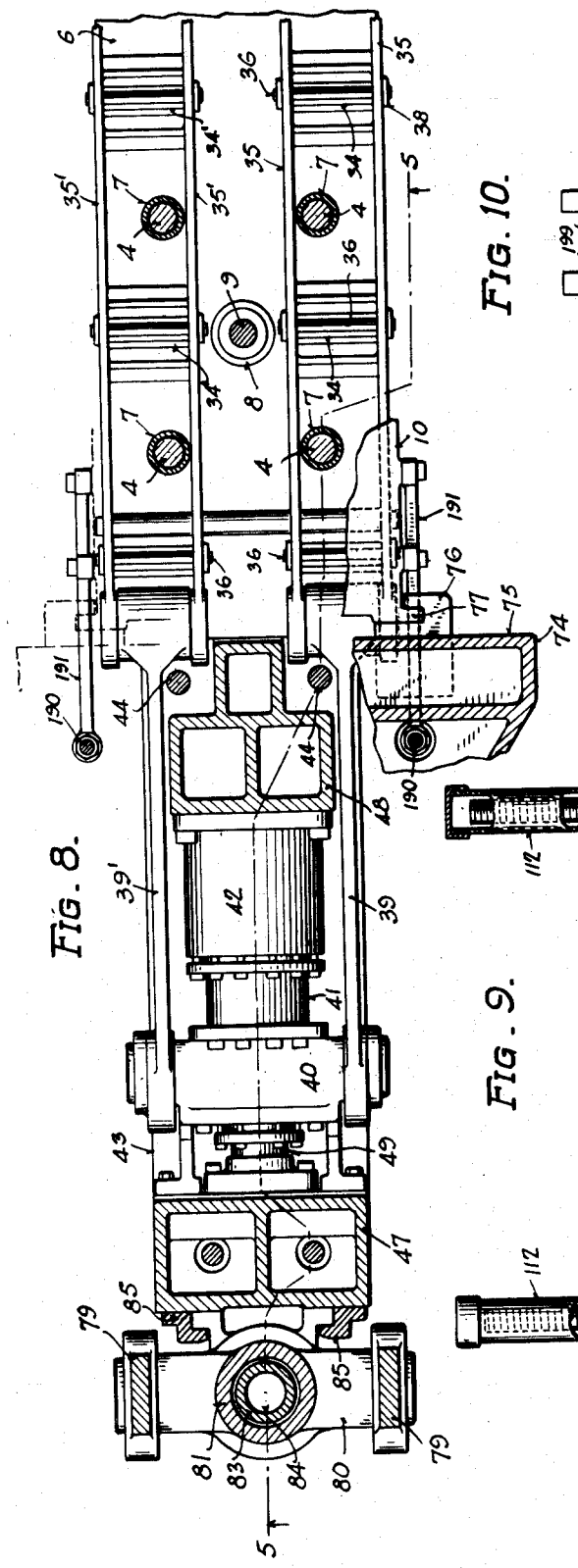
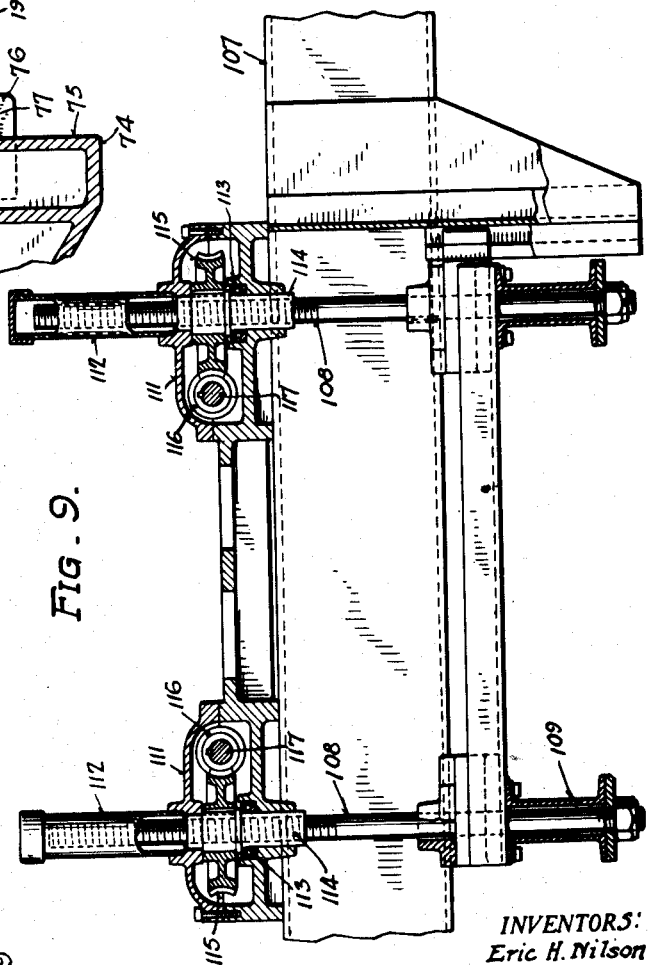
INVENTORS:
Eric H. Nilson
Sven Malke
Einar O. Holmberg
BY
ATTORNEY.

Aug. 23, 1932.  E. NILSON ET AL  1,872,793
FLASH WELDING MACHINE
Filed July 21, 1930    10 Sheets-Sheet 9
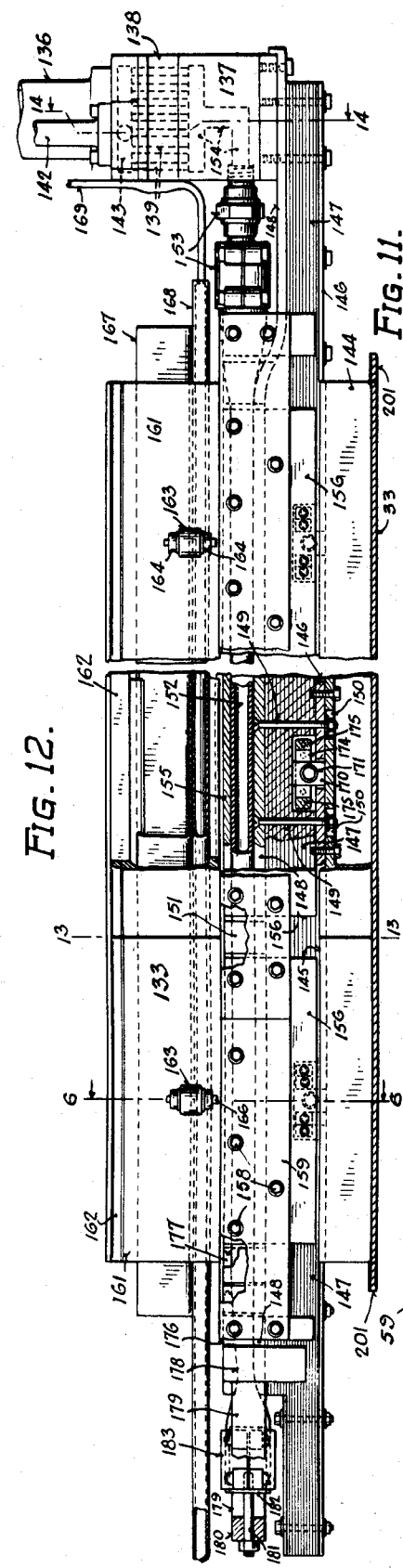
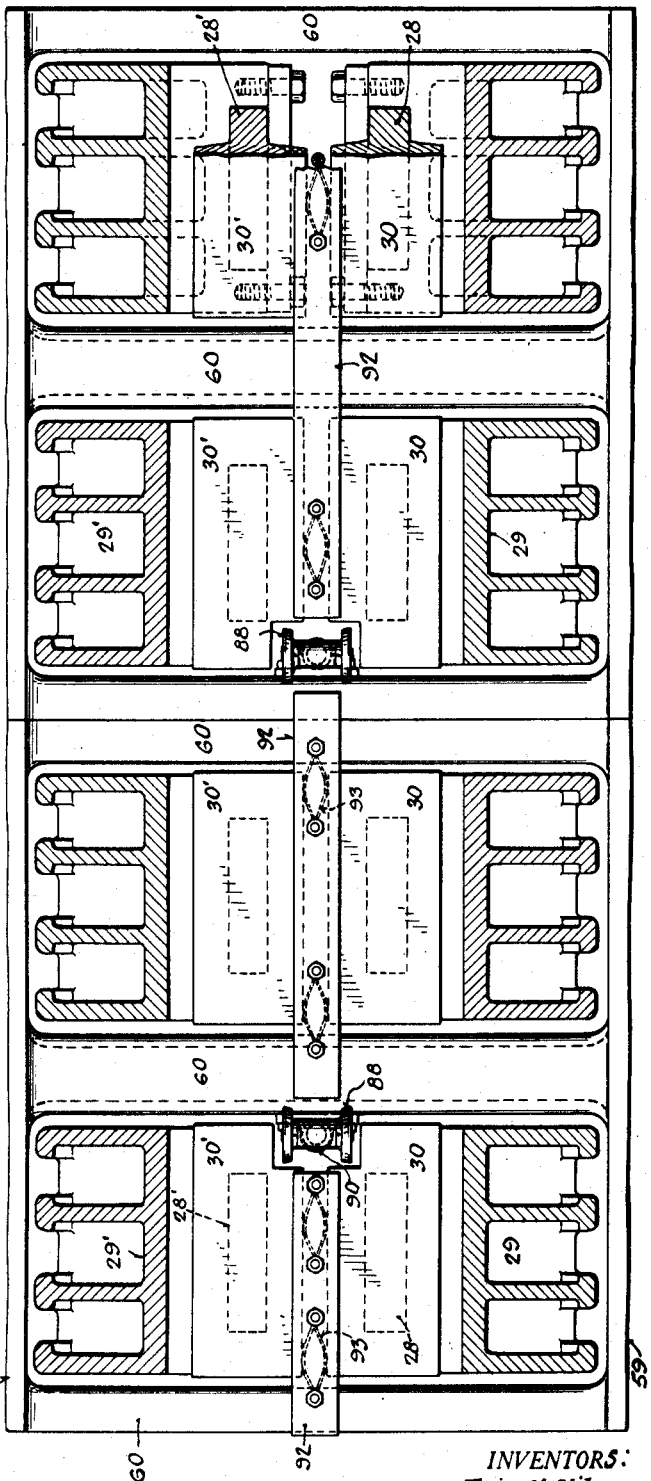
INVENTORS:
Eric H. Nilson
Sven Malke
Einar O. Holmberg
BY
ATTORNEY.

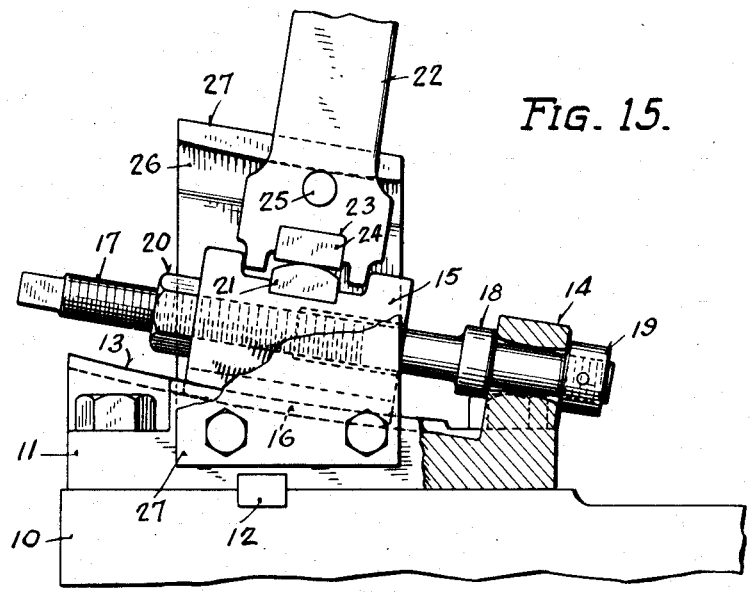
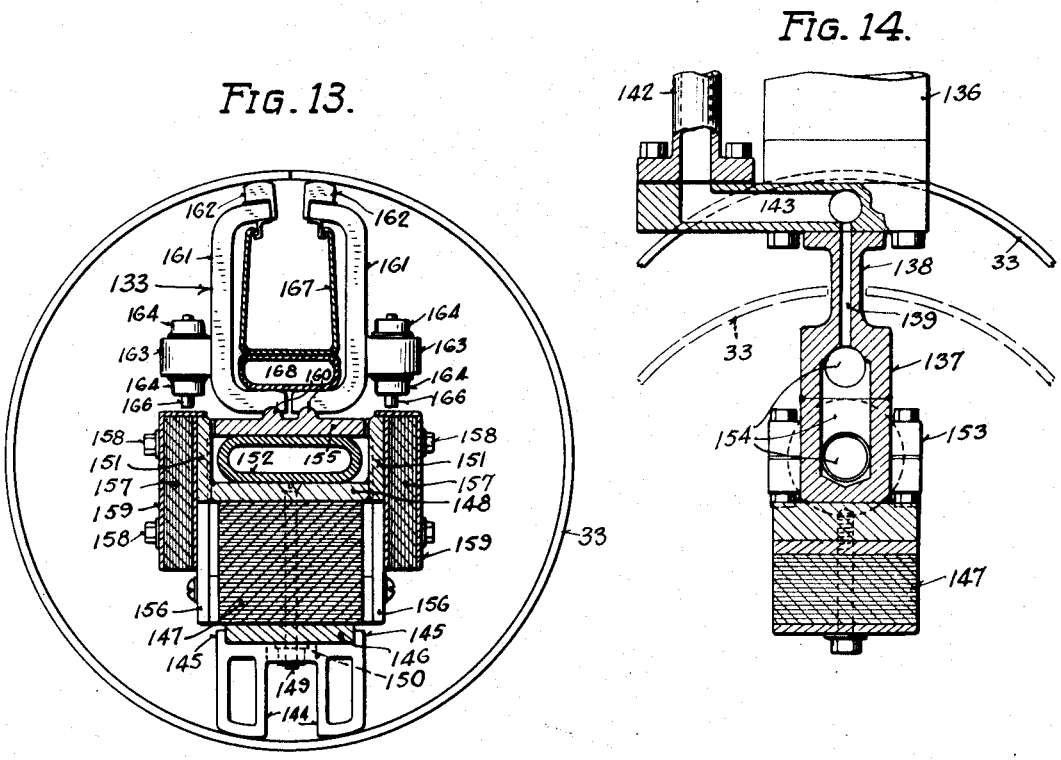

Patented Aug. 23, 1932

1,872,793

UNITED STATES PATENT OFFICE

ERIC NILSON AND SVEN MALKE, OF MILWAUKEE, AND EINAR O. HOLMBERG, OF WAU-
WATOSA, WISCONSIN, ASSIGNORS TO A. O. SMITH CORPORATION, OF MILWAUKEE,
WISCONSIN, A CORPORATION OF NEW YORK

FLASH WELDING MACHINE

Application filed July 21, 1930. Serial No. 469,462.

This invention relates to welding longitudinal seams in tubular articles and particularly to a machine for making flash welded tubular articles of substantial lengths.

Reference is made to a copending application of Birger T. Andren, Warren F. Heineman and William E. Crawford, Serial No. 435,090, filed March 12, 1930, which has a common assignee herewith and in which a machine for flash welding long tubular articles is disclosed and claimed.

The object of the present invention is to provide a welding machine of the class described which is simple in construction and operation and is especially adapted for mass production of tubular articles.

A further and more specific object of the invention is to improve the construction and operation of a flash welding machine for long tubular articles such as is set forth in the application above referred to.

The peculiar difficulties and problems attending the flash welding of long tubular articles have been briefly set forth in the above mentioned application and will not here be repeated.

The machine embodying the present invention has been successfully applied to the manufacture of pipe employed in pipe lines for the cross country transportation of oil, gas and other fluids under high pressures. Pipe sections employed in present day pipe lines range from twenty to forty feet in length, the maximum length being limited by transportation and handling facilities. The diameter of the pipe sections range from eight to thirty inches, the tendency being toward larger diameter pipe to meet the steadily increasing requirements for the fluids transported, and the wall thickness of the sections range from one eighth to five eighths inches, depending upon the fluid pressures employed.

Having in mind the physical characteristics and dimensions of the pipe, the difficulties involved in welding the longitudinal edges by establishing and maintaining an electric arc therebetween for the full length of the blank to heat the edges simultaneously to a welding temperature and upsetting or welding the edges together will be readily appreciated.

Figure 2:
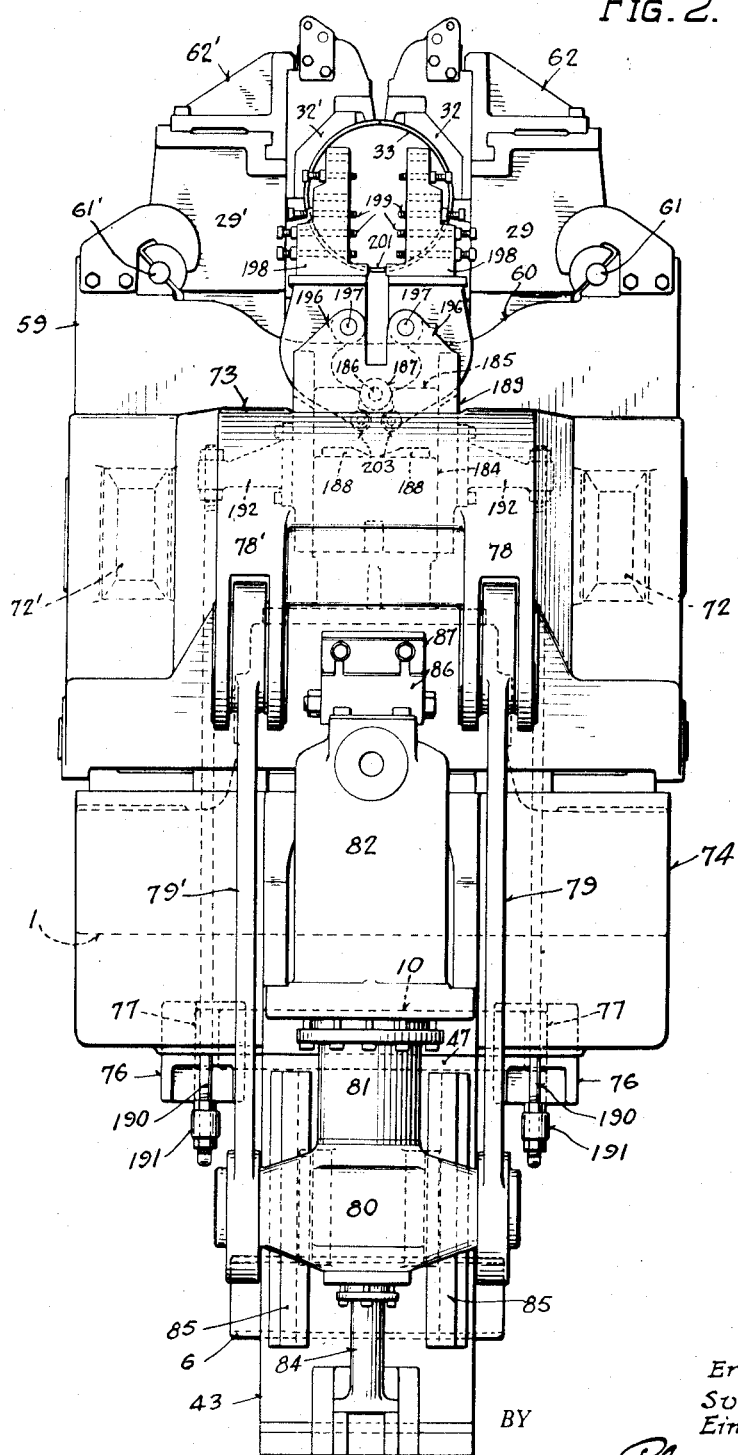
Figure 3:
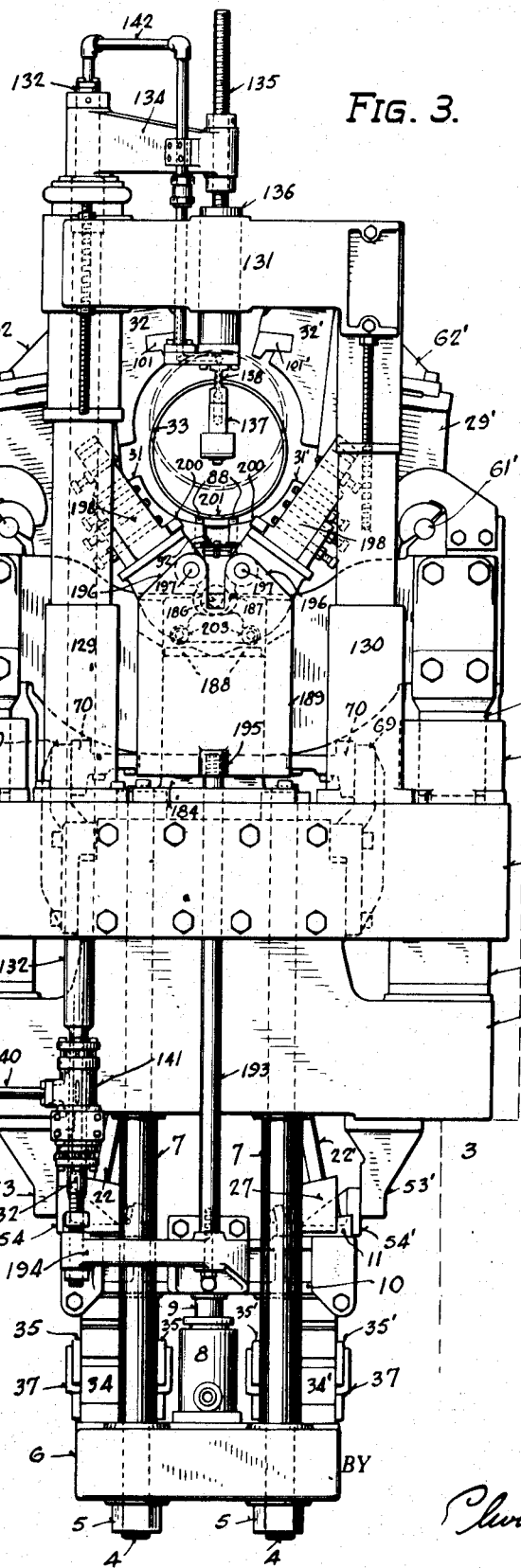
Figure 4:
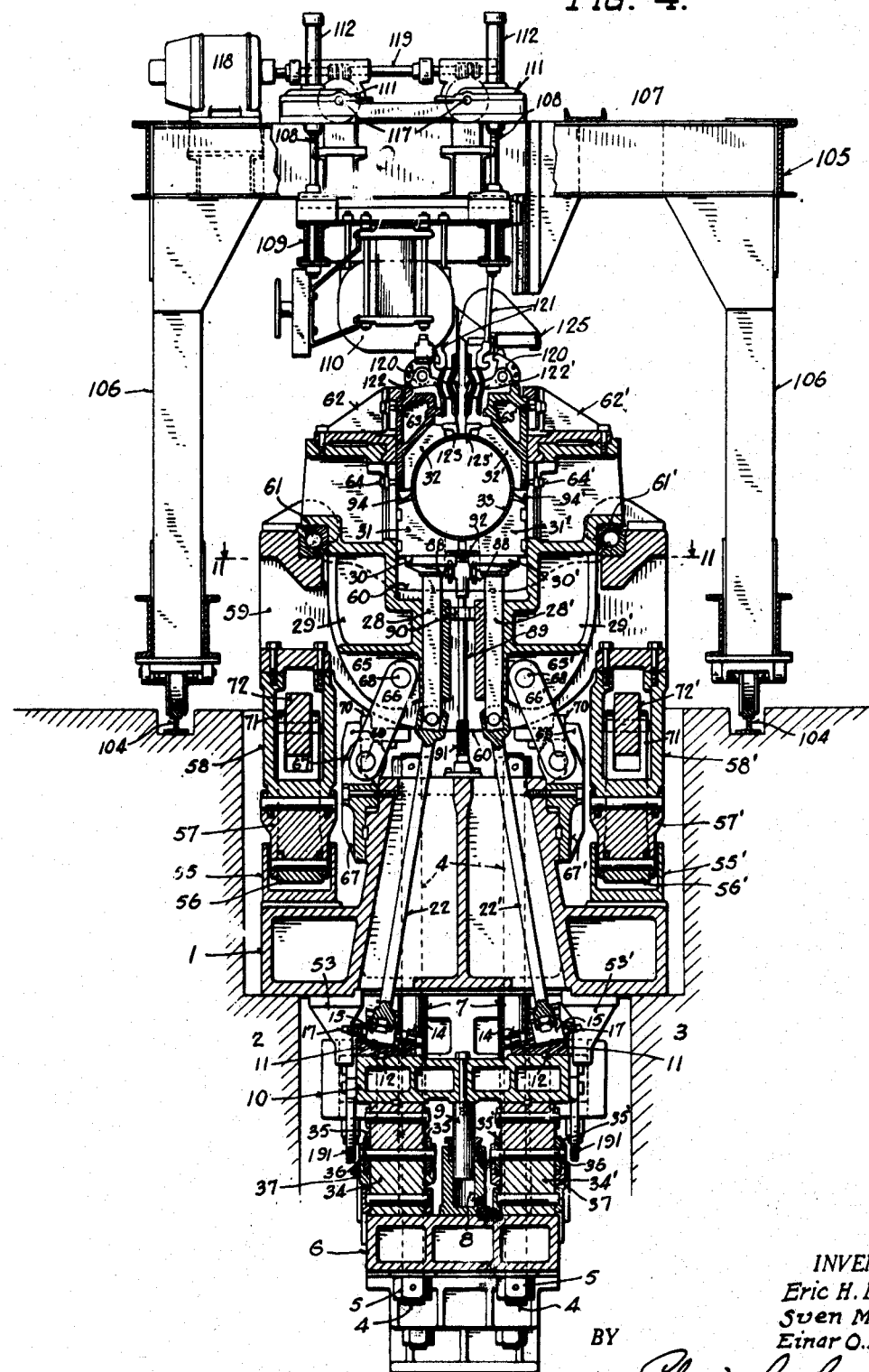
Figure 5:
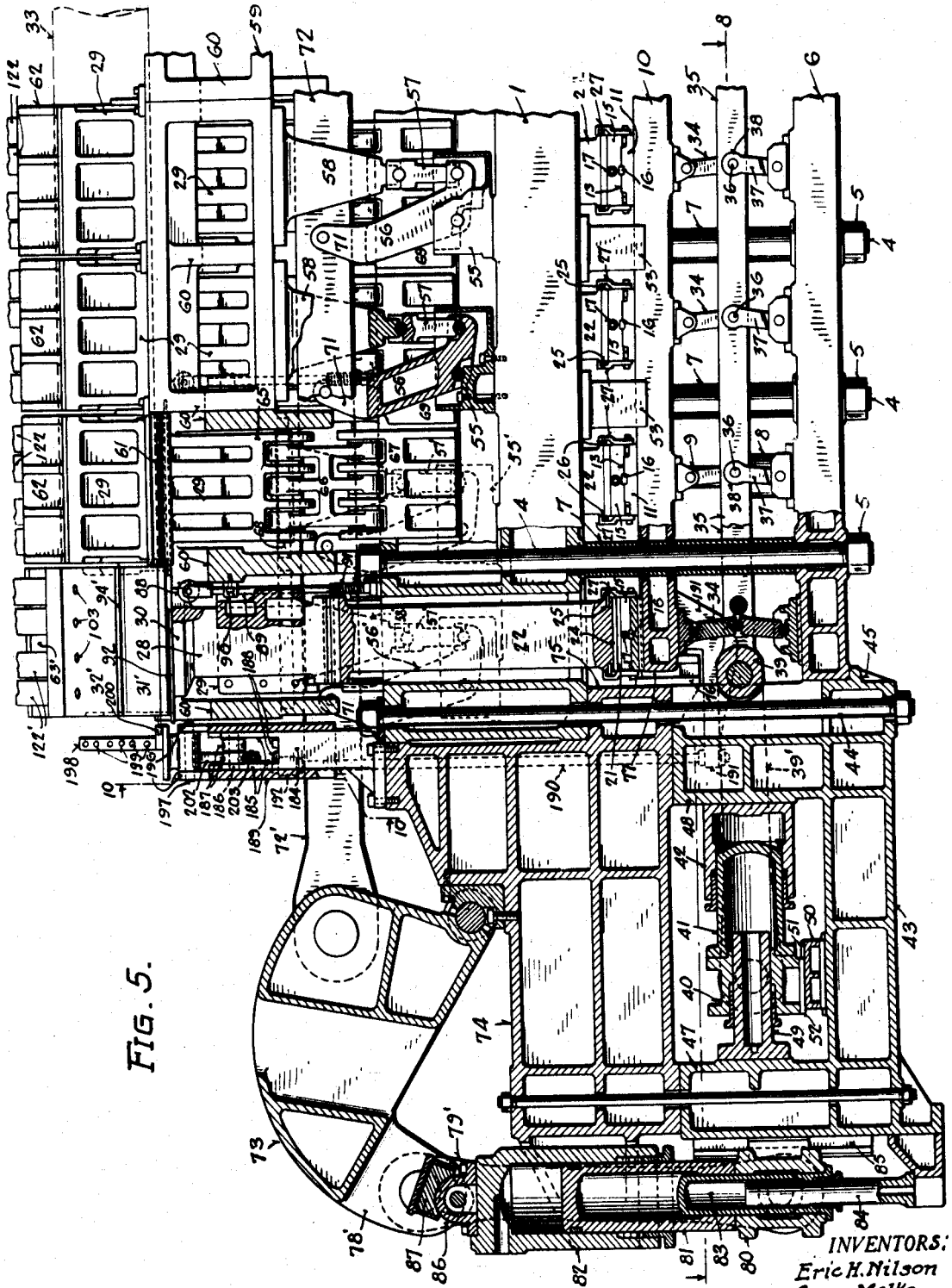
Figure 6:
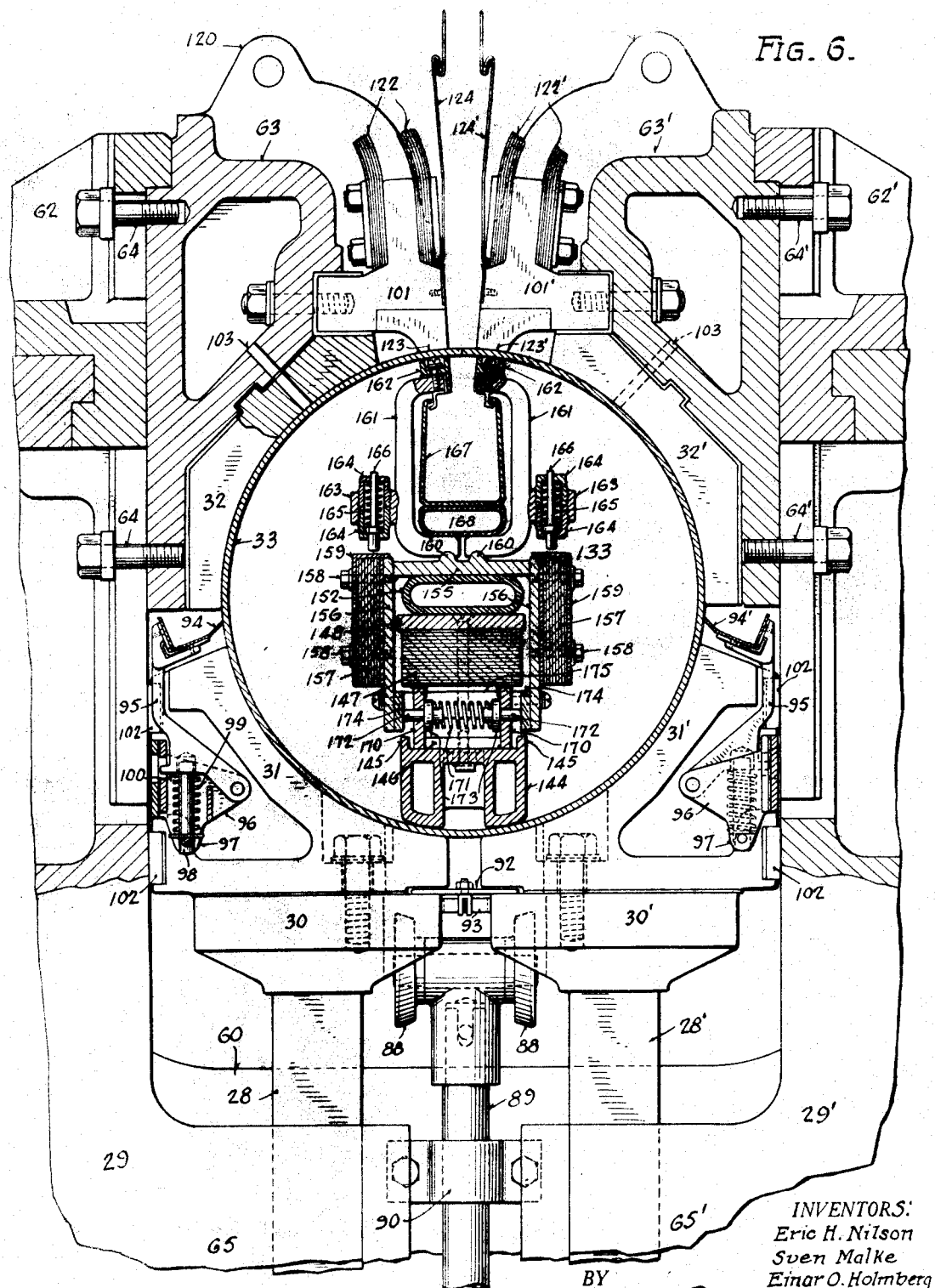

The invention will be best understood by referring to the accompanying drawings in which:

Fig. 1 is a side elevation.
Fig. 2 is an elevation of the drive end (left side Fig. 1) showing parts removed.
Fig. 3 is an elevation of the feed end (right end Fig. 1) showing parts removed.
Fig. 4 is a section on line 4—4 of Fig. 1.
Fig. 5 is a longitudinal detail view of the drive end showing parts in section taken generally on the line 5—5 of Fig. 8.
Fig. 6 is an enlarged transverse sectional view of the arbor and clamping jaws, the section of the arbor being taken on line 6—6 of Fig. 12.
Fig. 7 is a top plan view of the transformer carriage.
Fig. 8 is a section on line 8—8 of Fig. 5.
Fig. 9 is a section on line 9—9 of Fig. 7.
Fig. 10 is a transverse section on line 10—10 of Fig. 5, showing the blank and arbor locating mechanism.
Fig. 11 is an enlarged section on line 11—11 of Fig. 4.
Fig. 12 is a longitudinal view of the arbor, parts being broken away.
Fig. 13 is a section on line 13—13 of Fig. 12.
Fig. 14 is a section on line 14—14 of Fig. 12.
Fig. 15 is an enlarged detail view of the base of the lower die compensating toggles.

For a clearer understanding of the following description, complementary duplicate elements are referred to by prime numbers.

Referring more particularly to the drawings, the reference character 1 designates a longitudinally extending bed frame suitably supported at the sides thereof on concrete piers 2 and 3. The bed frame is of suitable size and strength to support the entire machine at working pressures.

Extending downwardly from the bed frame 1 are a plurality of tie rods 4 provided with nuts 5 at the lower ends for supporting a longitudinally extending stationary box girder 6. The tie rods 4 are enclosed within tubular spacing members 7 adapted to properly space the girder 6 from the frame 1.

The girder 6 supports a plurality of fluid pressure cylinders 8 arranged in vertical upright position and spaced longitudinally of the girder, said cylinders having pistons 9 adapted to reciprocate therein against continual fluid pressure and partially support a vertically movable beam 10 extending longitudinally of the machine parallel to the girder 6 and vertically spaced therefrom.

The movable beam 10 is provided with longitudinally spaced brackets 11 (see Figs. 4 and 15) secured to the upper marginal portions of the beam 10 by bolts and locked against transverse movement by keys 12. The brackets 11 have upper surfaces 13 curved to a predetermined radius and upwardly extending apertured lugs 14 at the inner ends of the brackets.

Supported upon the curved surfaces of the brackets are blocks 15 suitably splined thereto by keys 16 and adapted for limited transverse adjustments by means of screw shafts 17 extending through threaded openings in the blocks 15 and rotatably mounted in the lugs 14. The screw shafts are provided with collars 18 and 19 forming shoulders abutting against the lugs 14 to rotatably secure the shafts to the lugs. The free ends of the screw shafts 17 are squared or otherwise suitably shaped to receive wrenches for adjusting the transverse position of the blocks 15. Locknuts 20 are preferably provided on the shafts for securing the blocks in adjusted position.

The upper surfaces of the blocks 15 have recesses in which bearing members 21 are adapted to be seated as shown in Fig. 15. The upper faces of the latter are curved to provide a limited rocking support for inclined vertically extending struts 22—22'. The lower ends of the struts 22—22' are provided with recesses 23 in which liners 24 are seated to bear on the members 21. Extending outwardly from the base of the struts are oppositely disposed lugs 25 which are received within recesses 26 in opposite end plates 27 suitably secured to the brackets 11 and serve to retain the ends of the struts in position.

Referring to Fig. 4.

The upper ends of the struts 22—22' pivotally support vertical columns 28—28' extending through guide openings in movable clamp supporting levers 29—29'. The upper ends of the columns 28—28' are provided with plates 30—30' on which the lower die members 31—31' are supported.

The struts 22—22' are in angular relation to the respective columns 28—28' supported thereby and cooperate therewith to provide toggles which are operated by the movement of the clamp supporting levers 29—29' to effect a slight vertical movement of the lower clamping dies 31—31' relative to the upper clamping dies 32—32' during the operating stroke of the levers 29—29' for a purpose which will later be described. The amount of this toggle movement of the struts and columns during the operating stroke of the levers may be regulated by adjusting the transverse position of blocks 15 at the base of the struts 22—22'.

The lower die members 31—31' are adapted to engage the lower half of the tubular blank 33 and to support the blank for welding.

As shown in Figs. 1 to 5, inclusive, the stationary girder 6 and the movable beam 10 are connected together at each side margin thereof by a plurality of longitudinally spaced toggles 34—34' comprising upper and lower links. Extending longitudinally on each side of the toggles 34 and 34' are a pair of operating bars 35—35' respectively, having a plurality of spaced apertures for receiving the ends of the pins 36 which serve to operatively secure the bars to the toggles.

The lower links of the toggles are provided with brackets 37 having upwardly extending flanges 38, spaced from the toggles and extending over the ends of the pins 36 to retain the bars 35—35' in position.

The operating bars 35—35' at the drive end of the machine (see Fig. 8) are pivotally connected to longitudinally extending links 39—39' respectively, which are journaled to a cross head 40 of a reciprocating fluid pressure cylinder 41 operating within a second stationary fluid pressure cylinder 42 as is shown on the left hand sectional part of Fig. 5.

The drive end of the machine has a lower supporting frame member 43 secured to the bed frame 1 by suitable tie rods 44. The frame member 43 is preferably provided with a transversely extending flange 45 on the inner end thereof which forms a shoulder on which the adjacent end of the girder 6 rests.

The supporting frame member 43 comprises a base and a pair of longitudinally spaced vertically extending supporting walls 47 and 48 between which the fluid pressure cylinders for operating the bars 35—35' are located. The stationary fluid pressure cylinder 42 is secured to the inner wall 48 of the supporting frame and the outer wall 47 is provided with an inwardly extending cylindrical guide post 49 extending through cross head 40 of the reciprocating cylinder 41 and serving as a stationary piston for the same.

The base of the supporting frame 43 is provided with an upwardly extending bracket 50 intermediate the walls 47 and 48 and having a guide groove 51 in which a plate 52, secured to the reciprocating cross head 40, is adapted to slide.

The reciprocating fluid pressure cylinder 41 and the stationary cylinder 42 are both connected to a suitable source of fluid pressure (not shown) so that by a selective application of pressure within the respective cylinders, a longitudinal movement of the operating bars 35—35' and a resultant spread or collapse of the toggles 34—34' may be effected.

The stationary bed frame 1 is provided with downwardly extending guide brackets 53—53' (see Fig. 3) having bearing faces which are adapted to slidably engage brackets 54—54' on the movable beam 10 and transversely guide the same during the vertical movement of the beam.

The operation of the toggles 34—34' causes a raising and lowering of the movable beam 10 and a consequent vertical advance and retraction of the lower clamping dies 31—31'. The vertically extending fluid pressure cylinders 8 supported on the stationary girder 6 serve as a cushion when the beam 10 is dropped to permit the removal of the tubular blank from the machine and also support part of the weight of the beam 10, struts 22—22', and columns 28—28', thereby relieving the toggles 34—34' from excessive load during their movement.

Referring again to Figs. 1, 4, and 5, the bed frame 1 has a plurality of journal boxes 55—55' secured thereto at longitudinally aligned positions on each side of the frame, in which intermediate portions of bell crank levers 56—56' are journaled.

The lower arms of the bell crank levers extend horizontally within the journal boxes 55—55' and have pins serving to pivotally connect the levers to vertically extending links 57—57'. The upper ends of the links 57—57' are pivotally connected to upwardly extending brackets 58—58' which support a sectional frame 59 having a plurality of cross members 60. The top of the frame 59 is provided with journal bearings 61—61' which pivotally supports the clamping levers 29—29'.

Secured to the upper face of the levers 29—29' are brackets 62—62' and fastened to the inner faces of said levers and brackets are upper die supports 63—63' which may be vertically adjusted by bolts 64—64' passing through vertical slots in said levers and brackets.

The clamp supporting levers 29—29' are preferably made up of a plurality of sections secured in longitudinal alignment. Each of the levers 29 and 29' have a downwardly extending substructure 65 provided with a guide opening for a vertical column 28 or 28' as before mentioned. The levers 29—29' are connected to the bed frame 1 by longitudinally spaced links 66—66' (see Figs. 4 and 5) which are pivotally secured at the lower ends thereof to journal brackets 67—67' on the bed frame 1 and at their upper ends to pins 68 journaled in the substructure 65.

Extending between the brackets 67—67' and secured to the bed frame 1 are guide brackets 69 having bearing faces adapted to engage guide brackets 70 on the cross members 60 and serve to transversely guide the same during the vertical movement thereof.

The upper ends of the bell crank levers 56—56' are bifurcated to form spaced upwardly extending ears 71 which are pivotally connected to longitudinally extending bars 72—72' arranged therebetween. The bars 72—72' extend through recesses in the brackets 58—58' so that the operating bars, bell crank levers, and brackets are in the same longitudinal vertical plane as shown in Fig. 4.

The ends of the operating bar 72—72' at the drive end of the machine (as shown in Fig. 5) are journaled to the opposite sides of a main bell crank lever 73 having one end thereof pivotally supported on a bracket 74 extending from the drive end of the machine. The bracket 74 is suitably secured to the supporting frame member 43, and is preferably provided with a transverse interlocking tongue 75 adapted to seat between the stationary bed frame 1 and the frame member 43.

Secured to the interlocking tongue 75 on each side of the machine are guide brackets 76 (see Figs. 5 and 8) having a groove therein for receiving laterally extending projections 77 on the beam 10 and which serve to prevent the beam from shifting longitudinally during the operation of the machine.

The outer end of the main bell crank lever 73 is provided with downwardly extending forked ears 78—78' to which the upper ends of vertical links 79—79' are pivoted. The lower ends of the links 79—79' are pivotally secured to a cross head 80 of a reciprocal hollow piston 81 operating within a main fluid pressure cylinder 82 mounted on the bracket 74.

Secured within the reciprocating hollow piston 81 is a small fluid pressure cylinder 83 adapted to act against a lower vertical stationary piston 84 aligned with the main fluid pressure cylinder 82 and secured to the frame 43.

Supported upon the frame member 43 are flanges 85 forming a vertical T slot serving as a guiding groove for the cross head 80 secured to the reciprocating piston 81.

Supported upon and secured to the main fluid pressure cylinder is a cap member 86 to which a bumping block 87 is journaled. The bumping block 87 extends between the ears 78—78' and is adapted to abut against the bell crank lever 73 and form a stop for the operating stroke of the same.

The application of fluid pressure within the main fluid pressure cylinder causes a compound pivotal movement of the levers 29—29' and the upper dies secured thereto to compel the opposite side walls of the blank to pivot about a line in the center of the blank as will later be described.

The small fluid pressure cylinder 83 serves as a reversal chamber for retracting the levers 29—29'.

Disposed within recesses in the lower clamping dies 31—31' at spaced positions along the machine are a plurality of spring pressed rollers 88 (see Figs. 4, 6, and 11) supported on rods 89 which extend through guide brackets 90 on the cross members 60 and are secured to the bed frame 1 as is shown in Fig. 5.

The lower portions of the rods 89 are of reduced diameter enclosed within coil springs 91 adapted to form a resilient support for the rollers.

Extending longitudinally between the rollers are shield plates 92, see Figs. 6 and 11, received within longitudinal recesses in the respective lower dies 31—31' and held in central position by leaf springs 93 bearing against the opposed faces of the plates 30—30'. The shield plates 92 serve to prevent the metal flashed from the edges and other foreign material from dropping into the moving parts of the machine.

Disposed between the upper and lower dies 32—32' and 31—31', respectively, are longitudinally extending flash pans 94—94' supported by spring pressed lever arms 95 pivoted to brackets 96 in the lower dies 31—31', as shown in Fig. 6. The brackets 96 are each provided with downwardly extending spaced ears 97 between which a vertical pin 98 is secured. The pin 98 is provided adjacent its lower end with a circumferential shoulder which forms an abutment for a coil spring 99 which is interposed between the shoulders and a horizontally extending face 100 on the lever arms 95 so that the tension of the springs tends to maintain the inner lip of the flash pans 94—94' in contact with the walls of the blank when the dies are opened.

The dies 31—31' and 32—32' have curved inner faces which conform to the curvature of the blank to be welded. The dies and operating parts of the machine are electrically insulated from the electrodes 101—101' in any desired manner.

The lower dies 31—31' are provided on their outer faces with bearing plates 102 adapted to slidably engage the lower inner faces of the clamp supporting levers 29—29'.

The machine is adapted to accommodate different size pipe by providing sets of different size dies and removably mounting the dies in the machine substantially as shown. Where a smaller pipe is to be welded, for example, the dies are removed and the upper die supports 63—63' may be lowered by sliding the bolts 64—64' downwardly in the slots in the levers 29—29' and brackets 62—62'. Then a smaller set of upper and lower dies are inserted and the machine adjusted for welding.

Either one or both of the upper die supports 63—63' are of hollow construction which forms an air chest connected to a source of air pressure (not shown) and the die walls are provided with a plurality of longitudinally spaced ducts 103, see Fig. 6, so that, before clamping the blank in the dies, jets of air may be blown across the upper surface of the blank to remove any loose foreign material which might otherwise get under the electrode contacts and cause an attendant burning of the contact surfaces and walls of the blank.

Extending longitudinally on each side of the machine are rails 104, see Fig. 4, on which a transformer carriage 105 straddling the machine is adapted to travel. The carriage comprises uprights 106 and a frame 107.

Suspended from the frame 107 by a plurality of vertically adjustable threaded spindles 108 is a substructure 109 to which the welding transformers 110 are secured.

The spindles 108 extend through gear housings 111, see Fig. 9, which have capped tubular uprights 112 adapted to enclose the spindles.

Rotatably supported upon roller bearings 113 within each of the gear housings is an internally threaded sleeve 114 adapted to engage the threads of the spindle and to raise and lower the same. The sleeves 114 are keyed to and operated by gears 115 rotated by worm gears 116 on longitudinally extending shafts 117. The shafts 117 are connected to a motor 118 through the medium of a single transverse shaft 119.

The transformers may be raised or lowered by the adjustment above described to compensate for the welding of different size pipe without requiring the employment of different length leads for the electrodes.

The independent and removable support for the transformers enables the electrical equipment to be readily withdrawn from the remainder of the machine and thus facilitate repair and replacements of the mechanical parts of the machine and the electrical equipment.

To facilitate removal of the electrodes 101—101' and upper die supports 63—63' from the machine for repair and replacements, the die supports are provided with upwardly extending lugs 120 for detachably connecting the brackets to hangers 121 pivotally connected to the substructure 109 of the transformer carriage, as shown in Fig. 4.

By disconnecting the upper die supports 63—63' and operating the motor 118 the electrodes and transformers may be raised into inoperative position and, if desired, the entire transformer carriage 105 may be moved longitudinally from position over the mechanical parts of the machine.

The welding transformers 110 are of a suitable type capable of producing the desired voltage and amperage for flash welding and any suitable number may be employed, depending upon the length of the article to be welded.

The secondaries of the transformers are provided with flexible leads 122—122′ connected to the electrodes 101—101′ extending longitudinally of the blank being welded and adapted to engage the walls thereof on opposite sides of the welding cleft. The electrodes 101—101′ are suitably secured to and insulated from the upper die supports, as before stated. The electrodes have a plurality of removable contact faces 123—123′ having a curvature suitable for the specific size of pipe being welded.

Extending longitudinally between the flexible leads are spaced vertical shield plates 124—124′ forming a passageway leading to a pan 125 for receiving metal flashed outwardly from the edges of the blank during the welding operation.

Extending forwardly from the feed end of the machine and secured to the bed frame 1 is a bracket 126 arranged transversely of the machine below the feed level, as shown in Figs. 1 and 3.

This bracket is provided with guide blocks 127—127′ having rectangular openings in which guide posts 128—128′ secured to the end cross member 60 of the frame 59 are guided and serve to prevent longitudinal movement of the frame and clamping levers 29—29′.

Supported upon the bracket 126 on opposite sides of the die aperture are a vertically extending column 129 and a standard 130. The column 129 is located closely adjacent the end of the die opening whereas the standard 130 is positioned a substantial distance therefrom as shown in Fig. 1. The column 129 and the standard 130 are connected to each other at their upper ends by a vertically adjustable cross beam 131.

Extending through the column 129 and suitably guided therein is a tubular upright 132 having its lower end connected to the movable beam 10 supporting the lower die members so that a vertical movement of the tubular upright 132 will be effected by a movement of the lower die supporting beam 10 which is actuated by the spread and collapse of the toggles 34—34′.

The tubular upright 132 supports one end of an arbor 133, see Fig. 12, which is adapted to extend longitudinally within the tubular blank and press the walls thereof against the electrodes.

To accomplish this, the tubular upright 132 has an arm 134 secured to the upper end thereof. The free end of the arm is provided with a threaded aperture for receiving spindle 135. The lower end of the spindle is suitably connected to a guide post 136 extending through a guide opening in the cross beam 131. The lower end of the post 136 has a bracket 137 secured thereto for supporting the end of the arbor. The bracket 137 has a thin web portion 138 adapted to pass between the longitudinal edges of the blank when the latter is being inserted into the machine as shown in Fig. 14. The bracket is provided with a plurality of vertical ducts 139 connecting the arbor with a suitable pressure system capable of providing continual pressure of desired magnitude for purposes which will later be described. The fluid is adapted to enter the lower end of the tubular upright 132 through a connection 140 into a stuffing box 141 and from there up through the interior of the tubular upright into pipes 142 connecting the upright to a horizontal duct 143 opening into the vertical ducts 139.

Referring now to Figs. 6 and 12.

The arbor 133 is provided with a plurality of shoe members 144 arranged end to end to form a sectional supporting base having a lower surface conforming to the curvature of the blank and adapted to contact with the inner wall of the blank opposite the edges to be welded. The shoes are provided with upwardly extending marginal flanges 145 between which a plurality of shoe plates 146 are secured. Supported upon the plates 146 are a plurality of superimposed sheets of soft iron 147 forming a laminated magnetic core extending longitudinally of the blank for the full length thereof.

Supported upon the laminated sheets is a plate 148 extending longitudinally of the arbor and secured in position by bolts 49 extending downwardly into recesses 150 in the shoes. The lower ends of the bolts are provided with nuts so that the laminations are firmly clamped between the upper plate 148 and the shoe plates 146. The laminated sheets and the plates are secured at the feed end of the machine to the bracket 137 and are preferably of such length as to extend beyond the ends of the blank being welded, as set forth in an application of William E. Crawford, Serial No. 361,432, filed May 8, 1929.

The plate 148 is provided, at spaced positions along its length, with upwardly extending marginal lugs 151 as is shown in Fig. 13. Resting upon the plate 148 is a longitudinally extending transversely flexible hose 152 which is connected, at the feed end of the machine, to the ducts 139 in the bracket 137 through the medium of connections 153 and passages 154 in the bracket. The opposite end of the hose is closed, in a manner later to be described, so that fluid pressure may be maintained within the hose.

Supported upon the upper surface of the hose 152 is a longitudinally extending plate 155 which may be raised or lowered by regulating the fluid flow into and out of the hose.

The plate 155 has a plurality of flanges 156 secured at the side edges thereof which extend downwardly between the lugs 151 on the plate 148 and to which a plurality of soft iron laminations 157 are secured by means of bolts 158.

The plates 148 and 155, together with the side flanges 156, form a housing which envelops the hose and prevents the possibility of hot metal, flashed off the edges of the blank, from coming into contact with the hose. The laminations are preferably covered by a shield 159.

The upper surface of the plate 155 is provided with a pair of longitudinally extending parallel ribs 160 which form pivot supports for a plurality of pairs of outwardly curved supporting arms 161 arranged in longitudinal alignment.

The upper ends of the arms 161 have insulated liners 162 secured thereto which are adapted to engage the inner wall of the blank beneath the welding electrodes, as is clearly shown in Figs. 6 and 13. The arms are so supported upon the parallel ribs 160 as to permit a limited rocking movement of the arms during the welding operation so that the liners and supporting arms will be maintained beneath the electrodes during the entire movement of the latter and thereby maintain the desired balance of pressure between the electrodes and the wall of the blank and effect firm non-slipping electrode contact therewith.

Each of the arms 161 is provided with an outwardly extending lug 163 having a threaded opening for receiving complementary threaded tubular members 164 within which a vertically extending spring 165 is confined. The complementary tubular members 164 are provided with vertically aligned openings for receiving a pin 166 having a shoulder against which the spring 165 bears. The pins form resilient stops adapted to abut against shield plates 159 and limit the outward pivotal movement of the supporting arms. The normal position of the arms 161 may be adjusted upwardly or downwardly in the lugs by turning the tubular members.

Extending longitudinally for the full length of the machine within the recess formed by the curved portions of the arms 161 is a trough 167 adapted to receive the metal flashed inwardly from the edges of the blank during the welding operation. The trough is supported on a longitudinally extending tubular member 168 to which a cooling medium may be supplied through pipe 169 for cooling the flash in the bottom of the trough.

As shown in Fig. 12, the laminations 147 are recessed adjacent the central portion of the individual shoes for receiving centering devices for maintaining the plate 155 in a flat horizontal position and prevent a tilting of the plate and pivotal arms 161.

Secured to the shoe plates and extending upwardly into the recesses in the laminations are pairs of spaced lugs 170, Fig. 6, between which is interposed a coil spring 171. The lugs 170 are provided with aligned apertures for receiving oppositely disposed contact pins 172 having shoulders 173 abutting against the opposite ends of the spring 171.

Secured to and insulated from the downwardly extending flanges 156 are bearing plates 174 adapted to engage the outer ends of the pins 172 as shown in Fig. 6.

The opposite plates 174 are secured together by transversely extending bars 175 on opposite sides of the lugs 170.

The plate 155 is hinged at the exit end of the machine (left side of Fig. 12) to a longitudinally extending bar 176 through the medium of a link or bridge plate 177. The bar 176 has a downwardly and outwardly tapering inner face adapted to engage the upper surface of the hose extending beyond the end of the machine and aid in confining the end portion of the hose during the application of operating pressure within the same.

The plate 148 and bar 176 are secured together by uprights 178 connected to the opposite side walls thereof. Secured to the uprights 178 are longitudinally extending spaced supporting arms 179 which have the ends thereof connected together by a cross arm 180. The cross arm is provided with an aperture for receiving a bolt 181 which extends axially of the hose.

The end of the hose is expanded to substantially circular form and adapted to receive a core 182 which extends internally of the hose.

Surrounding the hose, outside the core, is a split clamp 183 to securely clamp the hose against the core and thus seal the end of the hose. The core is provided with an axially threaded recess for receiving the end of the axial bolt 181. By such construction, the hose is maintained in a straight position at all times and is prevented from creeping during the welding operation.

As before mentioned, the arbor is supported at the feed end of the machine by a bracket 137 connected to a post 136 adapted to be raised and lowered by the advance and retraction of the lower die members through the medium of the arm 134 and tubular upright 132 connected to the beam 10.

Disposed at both ends of the machine are locating jaws (Figs. 1, 2, 3, 5 and 10) for properly positioning the arbor and blank within the machine. To this end, the brackets 74 and 126 are each provided with vertical pedestals 184 suitably secured thereto. The pedestals are of rectangular contour and are provided with upwardly extending projections 185 having medial longitudinally aligned openings in which a journal pin 186 is located. Rotatably mounted on the pin is a pair of longitudinally aligned rollers 187.

Each pedestal is provided with oppositely disposed cam plates 188 between the projections 185.

Surrounding each pedestal is a box member 189, the one at the drive end of the machine being connected to the toggle operated beam 10 by a pair of spaced vertical drive rods 190 secured to the beam 10 and box 189 by brackets 191 and 192 respectively, as shown in Figs. 1, 2 and 5.

The box at the feed end of the machine (see Fig. 3) is connected to the movable beam 10 by a single vertical drive rod 193 having its lower end connected to a bracket 194 which also connects the tubular upright 132 to the beam. The upper end of the drive rod is connected to an extension 195 on the base of the box.

The transverse walls of the box member 189 have upwardly extending portions 196 which are provided with apertures for receiving journal pins 197. Pivotally connected to the journal pins are clamping jaws 198 adapted to close about the laminations extending outwardly from the arbor 133, as previously described, and properly position the arbor within the machine. The jaws 198 are provided with vertically spaced contacting pins 199 extending through threaded openings therein and adjustable so that the same may be adapted to arbors of different sizes. The clamping jaws 198 are provided with inwardly extending shoulders 200 having bearing faces adapted to bear against lugs 201 which are secured to the blank 33 opposite the welding cleft and thus serve to properly position the blank within the dies.

The clamping jaws 198 are further provided with downwardly and inwardly extending portions 202 positioned in offset relation to each other, see Fig. 5, so that the lower ends of the clamping jaws can slide past each other when the jaws are opening and closing. The extreme lower ends of the clamping jaws 198 are provided with rollers 203 adapted to bear against the surfaces of the cam plates 188 respectively when the jaws are lowered.

The upper surface of the lower inwardly extending portions 202 are provided with bearing faces adapted to bear against the respective rollers 187 during movement of the clamping jaws.

From the above description, it should be clear that the downward movement of the beam 10 and a consequent dropping of the lower dies 31—31' will further cause a lowering and opening of the arbor and blank locating jaws 198 in the following manner.

As the slidable box 189 connected to the beam 10 in the manner above described, moves downwardly, the clamping jaws 198 are also carried downwardly, causing the lower ends 202 of the clamping jaws to slide under the rollers 187 and effecting an outward pivotal movement of the clamping jaws. In event the lower ends of the clamping members fail to slide beneath the rollers 187, the lower rollers 203 on the jaws will engage the cam surfaces of the plates 188 and force the jaws to pivot outwardly. An upward movement of the sliding box will cause a reversal of the clamping movement.

The following is a brief description of the preferred manner of operating the machine.

Before inserting a tubular blank, having longitudinal edges to be welded, into the machine, the operating parts of the same are brought to inoperative position, as shown in Fig. 3, with the clamping dies 31—31' and 32—32' in open position, the arbor 133 collapsed and the source of the welding current disconnected from the welding electrodes 101—101'.

The blank 33 to be welded, formed in any desired manner and having spaced longitudinal edges, is then inserted endwise into the feed end of the machine by means of a suitable conveyor operating in conjunction with the same. During the insertion, the portion of the blank moving progressively in the machine is supported upon the rollers 88 which protrude a slight distance above the lower die faces as shown in Fig. 3 to prevent the blank from sliding on the lower dies 31—31'. The thin web portion 138 of the arbor supporting bracket 137 passes between the spaced edges of the blank during the insertion and thus aids in properly locating the position of the edges adjacent the welding electrodes.

After the blank is positioned within the welding machine, a blast of air or other gas is blown across the top of the blank from ducts 103 in the upper dies 32—32' so as to remove any loose foreign materials from the top of the blank and prevent the same from getting between the electrodes 101—101' and blank and cause a consequent burning of the contact surfaces of the electrodes and walls of the blank.

Fluid pressure is then applied to the main fluid pressure cylinder 82 which operates the main bell crank lever 73 and causes a longitudinal movement of the bars 72—72' actuating the bell crank levers 56—56' and thus effect a compound pivotal movement of the clamp supporting levers 29—29' to partially close the upper dies. The above levers are advanced during this operation preferably about half the limit of travel.

Fluid pressure is then cut off from the main operating cylinder 82 and supplied to the stationary fluid pressure cylinder 42 which causes the toggles 34—34' to spread and raise the beam 10. The upper vertical movement of the beam 10 raises the lower dies 31—31' (see Fig. 4) which causes the blank 33 to be lifted into approximate contact with the upper dies 32—32' and electrodes 101—101'. The upper movement of the beam 10 further causes the arbor support to be raised into position, (see Fig. 3) and the arbor locating jaws 198 to close about the ends of the arbor 133 and the lugs 201 on the blank, properly positioning the blank and arbor within the machine in a manner previously described.

The beam 10 is raised during this operation to its uppermost position with the toggle links 34—34' extending in slight off center relation to each other, see Fig. 5, and thus facilitate collapse of the toggles at the completion of the welding operation. The fluid pressure in the vertical cylinders 8 is maintained constant and forms a cushion for the beam 10 during the collapse of the toggles 34—34' and also compensates for a portion of the weight to be lifted by the toggles.

The arbor 133 is then expanded, by the application of fluid to the hose 152, so that the liners 162 on the pivotal arms 161 engage the inner wall of the blank beneath the electrodes 101—101'.

After the lower dies are in raised position and the arbor 133 is expanded the clamping levers 29—29' are again operated to further close the upper dies 32—32'. The closing of the dies forces the edges of the blank 33 to be welded into accurate abutting alignment and further clamps the tubular blank between the dies so that the walls of the blank are in pressure contact with the die faces throughout the full circumference thereof.

When the edges to be welded have been brought into abutting alignment and the blank has been clamped in the manner above indicated, the levers 29—29' are again operated to separate the edges by supplying fluid to the movable fluid pressure cylinder 83 within the cross head 80 which causes a reverse movement of the main bell crank lever 73 and the operating bars 72—72' connected thereto.

After the edges have been separated the desired distance, the movement of the levers is reversed to feed the edges of the blank toward each other and an electric welding current of desired characteristics is applied to the edges through the medium of the transformers 110 and electrodes 101—101'.

When certain limited regions of the opposite edges contact with each other, the metal of the edges in contact is immediately fused and flashed off by the welding current and an arc is established in such regions. Movement of the edges toward each other is continued until successive regions along the same have been flashed off and a uniform arc is established for the full length of the edges after which the arc is maintained by feeding the edges together at a carefully controlled speed until the metal at the edges has been brought to a plastic welding condition.

After the arc has been established for a sufficient length of time to heat the metal at the edges to a welding temperature, the levers 29—29' are operated in a manner before described to rapidly force the edges together under pressure to weld, extrude and upset the same and form an integral welded union between the edges and thus complete the welding operation. The welding current may be interrupted either before, during, or after the upsetting operation.

The arbor 133 is then collapsed by withdrawing pressure from the hose 152 and the clamp supporting levers 29—29' are operated to open the upper dies 32—32'. The lower dies 31—31' are dropped by relieving the pressure in the stationary cylinder 42 and applying pressure to the movable cylinder 41 thereby bringing the clamping dies into open position as shown in Fig. 3. The welded pipe then rests on the rollers 88 and may be removed from the machine by the insertion of the next succeeding blank. The arbor is properly centered and prevented from longitudinal movement during insertion and removal of the blank by the bracket 137.

It should be borne in mind that the movement of the edges to be welded toward each other in the flashing and upsetting operations will naturally cause a shrinking or changing of the size of the blank and since the dies 31—31' and 32—32' have a fixed facial contour the walls of the blank at certain portions of the circumference thereof will normally tend to bend away from the die faces unless some provision is made to the contrary. The loosening of the blank within the dies, if not prevented, will cause an unbalancing of the clamping pressure which will enable the blank to slip relative to the clamps and electrodes or possibly prevent application of the required final welding pressure to the blank.

In order to overcome this tendency of the blank to slip relative to the electrodes and clamps, the machine is so constructed and arranged that the change in contour of the blank is forced to take place within a predetermined definite localized area between the dies 31—32 and 31'—32' which are disposed on opposite sides of the blank or, expressed in other words, the side walls of the blank are forced to hinge about a line or area in the bottom wall of the blank located substantially in a diametrical plane extending through the welding cleft in a manner similar to the opening and closing of clam shells.

Such movement causes substantially no reduction in diameter along the vertical axis of the blank.

This clam shell movement of the side walls of the blank is accomplished by causing the clamping dies to move in a similar manner, that is, by causing the clamping dies and levers associated therewith to hinge about a line or center which is located adjacent the bottom wall of the blank directly opposite the welding cleft.

In the machine illustrated this action is accomplished by so constructing and arranging the parts that a line connecting the vertically movable pivotal points 61—61' of the oppositely disposed clamping levers 29—29' will be substantially tangential to the bottom wall of the blank during the welding operation. By such construction, the adjacent inner sides of the lower dies 31—31' remain relatively stationary and the remaining portion of the dies and die supporting levers are adapted to pivot relatively about the bottom wall of the blank in the manner above described.

The links 66—66' are preferably located so that a line passing through the two pivotal points of the links 66 and a similar line passing through the two pivotal points of links 66' will intersect with each other adjacent the bottom wall of the blank during the welding operation.

In operation, each of the edges of the blank are caused to move toward or away from the other edge in a circular path having a center approximately located near or in the wall of the blank opposite the welding cleft. This center of curvature may be caused to move during the welding operation both laterally and vertically relative to the blank and the centers for the respective edges may coincide during at least part of the welding operation.

It has been found preferable to design the machine in a manner to locate the centers of movement of the respective edges approximately in the wall of the blank during the flashing operation, although the machine may be so designed as to provide the centers substantially above or below the blank wall, as desired. For instance, it may sometimes be desirable to locate the phantom center or pivotal line for the clamping levers above or below the center wall of the blank. For example, it may be desirable to effect a slight crowding of the lower dies with respect to the walls of the blank in which case the pivotal or phantom center would be located slightly below the center wall of the blank. On the other hand, in certain instances it may be desirable to locate the pivotal center slightly above the center wall of the blank.

Furthermore, the above described movement of the edges should be considered only with respect to the blank, since any movement of the blank as a whole during the welding operation does not affect the relation of the side walls and edges of the blank.

When compartively thick walled blanks are being welded, it is impractical to provide sufficient clamping pressures to force the walls to pivot or hinge about a line, small area or band in a manner above described and it has been found preferable to permit the blank to slightly change its vertical diameter and to provide compensating means for slightly changing the vertical diameter of the die opening during the movement of the clamping levers 29—29'.

Referring to Fig. 4, it will be noted that the lower dies 31—31' will be raised slightly, due to the toggle character of the supporting struts 22—22' and the column 28—28', during the closing movement of the levers 29—29', and thus compensate for the lifting of the bottom of the blank or reduction in vertical diameter, during the pivotal movement of the walls of the blank as above described.

The links 66—66' may be positioned to aid in the compensating action of the toggles provided by the struts and columns by causing a small downward movement of the upper dies 32—32' during the closing of the clamping levers.

As before mentioned, the toggle action of the struts and columns may be regulated by adjusting the transverse position of the blocks 15 supporting the struts.

The radius of the curved surface of the adjusting blocks 15 is preferably equal the length of the strut and the center of the curve is approximately at the opposite end of the respective struts when in normal clamping position prior to the flashing operation. This allows a transverse adjustment of the lower end of the strut without changing the vertical position of the lower dies which would require a corresponding resetting of the vertical position of the upper dies.

The construction above described insures that the blank will be entirely surrounded by, and securely clamped between the dies and to the electrodes throughout the movement of the edges attending the flashing and upsetting operation, regardless of the changes in contour and the reduction in diameter of the blank resulting from such movement.

The resilient, floating character of the arbor within the blank, due to the fluid pressure hose and pivotal bracket arms supported thereby, insures a substantially constant pressure contact between the blank and the electrodes for the full length of the same and enables the blank being welded to change its shape so that the same will conform to the curvature of the dies throughout the welding operation. Furthermore, the pivoting of the arms in the arbor with the movement of the pipe walls during the flashing and upsetting operations tends to change the vertical dimension of the arbor and this tendency is overcome by the compressibility of the hose.

The provision of flash pans above and below the edges and on the outer side walls of the blank prevents the metal flash from collecting on and abrading the operating parts of the machine.

The present invention makes it possible to weld tubular articles of substantial lengths, such as pipe, more rapidly and economically and produces a product of improved characteristics.

While the above is the preferred manner of construction and operation of the machine, it is understood that various modifications may be made in the construction of the machine and various modes of operation of the same may be employed within the scope of the accompanying claims.

We claim:

1. A welding machine for flash welding the full length of a single longitudinal seam in a tubular blank, comprising means for supplying a welding current to the longitudinal edges to be welded, and means for moving said edges relatively toward each other to maintain an electric arc between the same simultaneously for the full length thereof and thereafter to press said edges together, a part of said last named means being adapted to contact with substantially the full outer circumference of the blank during the entire welding operation.

2. A welding machine for flash welding the full length of a single longitudinal seam in a tubular blank, comprising means for supplying a welding current to the longitudinal edges to be welded, and means for moving the opposed curved walls of the blank adjacent the edges along substantially an arc of a circle toward one another to establish and maintain an electric arc between the same simultaneously for the full length thereof and thereafter to press said edges together, a part of said last named means being adapted to contact with the side walls of the blank during the entire welding operation.

3. A welding machine for use in the manufacture of a tubular article having a longitudinal weld, comprising means for supplying a welding current to the longitudinal edges of the blank to be welded, and means moving as if pivoted about the wall of the blank opposite the welding cleft and causing the edges to be welded to move relatively toward each other in a pivotal path approximating the path of said means.

4. A welding machine for use in the manufacture of a tubular article having a longitudinal weld, comprising means for supplying a welding current to the longitudinal edges of the blank to be welded, and means for moving the edges to be welded in a substantially circular path having a center in proximity to the wall of the blank opposite the welding cleft during at least a part of the welding operation.

5. A welding machine for use in the manufacture of a tubular article having a longitudinal weld, comprising means for supplying a welding current to the longitudinal edges of the blank to be welded, clamping levers for moving the edges to be welded, and means for operating said levers to cause the same to move as if pivoted about a longitudinal line in the proximity of the wall of the blank opposite the welding cleft.

6. A welding machine for use in the manufacture of a tubular article having a longitudinal weld, comprising means for supplying a welding current to the longitudinal edges of the blank to be welded, and means rotating about a longitudinal line in proximity to the wall of the blank opposite the welding cleft to cause the edges to be welded to move relatively toward each other.

7. A welding machine for welding a longitudinal seam in a tubular blank, comprising means for supplying a welding current to the longitudinal edges of the blank to be welded, cooperating pivotal clamping levers for moving the edges to be welded toward each other, the pivotal points of said levers being a fixed distance apart and so arranged that a straight line drawn between the same is substantially tangential to the wall of the blank opposite the welding cleft during a part of the welding operation, and means for operating said pivotal levers to cause a relative movement of the edges, said last named means causing relative movement between the respective pivotal points and the wall of the blank opposite the welding cleft in a direction substantially perpendicular to said tangential line.

8. A machine for welding a longitudinal seam in a tubular article, comprising electrodes extending longitudinally of the blank and adapted to engage the walls thereof adjacent the edges to be welded to supply welding current thereto, means for applying external pressure to the blank including electrode contact pressure and for moving the edges of the blank to establish and maintain a flashing arc simultaneously for the full length thereof, and resilient means disposed within the blank for supporting the walls of the same against the external pressure applied during the flashing operation.

9. A machine for welding a longitudinal seam in a tubular article, comprising electrodes extending longitudinally of the blank on each side of the welding cleft, clamping dies surrounding the tubular blank and adapted to clamp the tubular blank between the dies and to the electrodes, means for operating the dies to move the edges relatively toward and away from each other, and resilient means disposed within the tubular blank to support the walls thereof against the clamping pressures.

10. A machine for welding a longitudinal seam in a tubular article, comprising electrodes extending on each side of the welding cleft to supply welding current thereto, means for clamping the blank against the electrodes and in position for welding, levers arranged to support said clamp and disposed on opposite sides of the blank, and means for effecting a compound pivotal movement of the levers to move the edges relatively toward and away from each other.

11. A machine for welding a longitudinal seam in a tubular article, comprising electrodes extending longitudinally of the blank and adapted to engage the walls thereof on each side of the welding cleft to supply welding current thereto, clamping members arranged outside the blank and oppositely disposed from said electrodes, fluid pressure toggle means for moving said clamping members toward and away from the electrodes, and means for moving the edges to be welded toward and away from each other.

12. A machine for welding a longitudinal seam in a tubular article, comprising electrodes extending longitudinally of the blank on each side of the welding cleft to supply welding current thereto, clamping members, means for operating the clamping members to clamp the tubular blank to the electrodes and between the clamping members and to move the edges to be welded toward and away from each other, an arbor disposed within the tubular blank to support the walls thereof against external clamping pressures, and means for locating said arbor with respect to the welding cleft.

13. A machine for welding a longitudinal seam in a tubular article, comprising electrodes extending longitudinally of the blank on each side of the welding cleft to supply welding current thereto, clamping members, means for operating the clamping members to clamp the tubular blank in position for welding and to move the edges to be welded toward and away from each other, an arbor disposed within the tubular blank, means for locating said arbor within the blank, and means for operating said locating means simultaneously with the movement of certain of the clamping members.

14. A machine for welding a longitudinal seam in a tubular article, comprising electrodes extending longitudinally of the blank on each side of the welding cleft to supply welding current thereto, clamping members engaging the outer walls of the blank, a movable beam, members connecting said movable beam to certain of said clamping members to move the same toward and away from said electrodes, an arbor disposed within the tubular blank to support the walls thereof against the electrode contact pressures, a support for said arbor at one end of the machine connected to said movable beam, means operated by the movable beam for positioning the arbor with respect to the welding cleft, and means for operating the clamping members to move the edges to be welded relatively toward and away from each other to establish and maintain an arc between the edges and thereafter to press the heated edges together.

15. An apparatus for welding a longitudinal seam in a tubular article, comprising clamping levers adapted to be disposed on opposite sides of the tubular blank to be welded, electrodes connected to said levers and adapted to engage the walls of the blank on each side of the welding cleft, clamping jaws secured to said levers and adapted to engage the walls of the blank adjacent the electrodes, clamping means arranged between said levers and adapted to move toward said clamping jaws to bring the tubular blank into position for welding, and means for operating said clamping means and levers to clamp the tubular blank to the jaws and electrodes and to move the edges to be welded relatively toward and away from each other.

16. In a machine for welding the full length of a longitudinal seam in a tubular blank simultaneously, an arbor disposed within the tubular blank and adapted to support the same against external pressure during the welding operation, said arbor comprising a base engaging the inner wall of the tubular blank opposite the edges to be welded, pivotal arms arranged above the base and engaging the inner wall of the tubular blank adjacent the welding edges, and resilient means supporting said pivotal arms.

17. In a machine for welding the full length of a longitudinal seam in a tubular blank simultaneously, an arbor disposed within the tubular blank and adapted to support the same against external pressure during the welding operation, said arbor comprising a base adapted to engage the inner wall of the tubular blank opposite the edges to be welded, pivotal arms arranged above the base and adapted to engage the inner wall of the tubular blank beneath the welding electrodes, and a fluid pressure operated flexible member supporting said pivotal arms and adapted to change in volume during the welding operation to compensate for the pivoting of said arms.

18. In a machine for flash welding a longitudinal seam in a tubular blank, in combination, an arbor for supporting the walls of the blank, jaws carried by the machine for engaging and centering the arbor in engagement with the walls of the blank to cooperate in the welding operation, and means for actuating the jaws.

19. In a machine for flash welding a longitudinal seam in a tubular article and having an arbor adapted to be disposed within the tubular blank, an arbor support disposed at the feed end of the machine, said support comprising spaced uprights disposed on opposite sides of the blank, a cross bar connecting said uprights, a vertically movable tubular member slidable in one of said uprights, a transverse supporting arm secured to said tubular member, a vertically adjustable bracket secured to the last named arm and extending through said cross bar, and an arbor supporting bracket connected to said adjustable bracket.

20. A machine for welding a longitudinal seam in a tubular article, comprising electrodes extending longitudinally of the blank and adapted to engage the walls thereof on each side of the welding cleft, and means tending to pivot the side walls of the blank about a localized area of the blank diametrically opposite the welding cleft to move the edges to be welded relatively toward and away from each other.

21. A machine for welding a longitudinal seam in a tubular article, comprising electrodes extending longitudinally of the blank on each side of the welding cleft, clamping members adapted to clamp the tubular blank to the electrodes, means to cause the side walls of the blank to pivot about the wall opposite the welding cleft to thereby move the edges relatively toward and away from each other, and a resilient arbor disposed within the blank and adapted to support the walls thereof against the external clamping pressures.

22. A welding machine for use in the manufacture of a tubular article having a longitudinal weld, comprising means for supplying a welding current to the longitudinal edges of the blank to be welded, means for establishing a flashing arc between the edges to be welded, and means to move one of said edges relative to the other edge in a substantially circular path to maintain the flashing arc, said last named means effecting a shortening in the radius of movement of said edge during the flashing operation.

23. A welding machine for use in the manufacture of a tubular article having a longitudinal weld, comprising means for supplying a welding current to the longitudinal edges of the blank to be welded, means for establishing a flashing arc between the edges to be welded, and means to move one of said edges relative to the other edge in a substantially circular path to maintain the flashing arc, the center of movement of said edges being sufficiently near the wall of the blank diametrically opposite the welding cleft to maintain substantially constant the diameter extending from the welding cleft.

24. A welding machine for use in the manufacture of a tubular article having a longitudinal weld, comprising means for supplying a welding current to the longitudinal edges of the blank to be welded, means for establishing and maintaining a flashing arc between the edges and for pressing the edges together to weld the same, and circumferential clamping means extending from the welding cleft and arranged to maintain the diameter of the blank, substantially constant during the flashing period.

25. A machine for welding a longitudinal seam in a tubular article, comprising electrodes extending on opposite sides of the welding cleft and in contact with the work to supply welding current thereto, clamping levers disposed on opposite sides of the blank to control the movement of the edges during the welding operation, said levers being linked to a stationary member and having operating pivotal connections extending longitudinally of the machine, and means for moving the pivotal connections relative to the blank and to the stationary member to cause a compound pivotal movement of said levers.

26. An apparatus for welding a longitudinal seam in a tubular article, comprising clamping levers adapted to be disposed on opposite sides of the tubular blank to be welded, electrodes connected to said clamping levers and adapted to engage the walls of the blank on each side of the welding cleft, clamping jaws secured to said levers and adapted to engage the walls of the blank adjacent the electrodes, clamping jaws movably mounted in said levers and adapted to cooperate with said electrodes to clamp the blank for welding, means for operating said last named clamping jaws to bring the blank into clamping position, and means for operating the levers to cause the same to move as if pivoted about a center located adjacent the wall of the blank opposite the welding cleft, to clamp the tubular blank and to move the edges to be welded relatively toward and away from each other.

27. An apparatus for welding a longitudinal seam in a tubular article, comprising clamping levers adapted to be disposed on opposite sides of the tubular blank to be welded, electrodes connected to said clamping levers and adapted to engage the walls of the blank on each side of the welding cleft, clamping jaws secured to said levers and adapted to engage the walls of the blank adjacent the electrodes, cooperating clamping jaws movably arranged between said levers and cooperating with said electrodes to clamp the blank for welding, means for operating said last named clamping jaws to bring the blank into clamping position, and means for effecting a compound pivotal movement of the levers about a theoretical center located in proximity to the wall of the blank opposite the welding cleft to clamp the tubular blank and to move the edges to be welded relatively toward and away from each other.

28. A machine for welding a longitudinal seam in a tubular article, comprising electrodes adapted to engage the walls of the blank to be welded on each side of the welding cleft, clamping levers arranged on opposite sides of said blank, clamping members disposed between the levers and adapted to engage the walls of the blank, a stationary element, links pivotally connected to the stationary element and to the clamping levers and so disposed that a line passing through the two pivotal points of any one of said links will normally pass through the wall of the blank substantially opposite the welding cleft, and power operating members pivotally connected to the clamping levers, the pivotal connections thereof being so arranged that a plane passing through said connections will be substantially tangential to the wall of the blank opposite the welding cleft during the flashing operation, said power operating members being adapted to effect a compound pivotal movement of said levers to move the edges to be welded toward each other during the welding operation.

29. In a machine for welding a longitudinal seam in a tubular blank, comprising electrodes extending longitudinally of the blank on each side of the welding cleft, a stationary frame, clamping levers arranged on opposite sides of the blank, upwardly converging transversely spaced links pivotally connected at the lower ends thereof to said frame and at the upper ends thereof to said clamping levers, clamping dies disposed between the levers and adapted to surround the tubular blank, means acting independently of the levers to bring the blank into clamping position, and means for operating the levers to clamp the tubular blank to the electrodes and to move the edges to be welded toward and away from each other.

30. In a machine for welding a longitudinal seam in a tubular blank, comprising electrodes extending longitudinally of the blank on each side of the welding cleft, a frame, clamping levers arranged on opposite sides of the blank to be welded, a plurality of upwardly converging pairs of links pivotally connected at the lower ends to the frame and at the upper ends to the levers, the point of convergence of the center lines of said pairs of links being adjacent the bottom wall of the blank opposite the welding cleft when the blank is in welding position, clamping dies disposed between the levers and adapted to engage the outer walls of the blank, and means for operating the levers to clamp the tubular blank between the dies and to the electrodes and for moving the edges to be welded toward and away from each other.

31. A machine for electric welding a longitudinal seam in a tubular blank, comprising means for supplying a welding current to the longitudinal edges of the blank to be welded, means for positioning the blank for welding, cooperating pivotal clamping levers disposed on opposite sides of the blank, means for moving the pivotal points of said levers relative to the blank while maintaining said points a fixed distance apart, and means for causing a pivotal clamping action of said levers during movement of said pivotal points to move the edges to be welded toward each other to effect a welding thereof.

32. A machine for electric welding a longitudinal seam in a tubular blank, comprising means for supplying a welding current to the longitudinal edges of the blank to be welded, means for positioning the blank for welding, cooperating pivotal clamping levers disposed on opposite sides of the blank, means for causing a movement of the pivotal points of said levers in paths perpendicular to a plane tangential to the wall of the blank opposite the welding cleft while maintaining said pivotal points a fixed distance apart, and means for causing a pivotal clamping action of said levers during said movement to move the edges of the blank toward each other to effect a welding thereof.

33. A machine for electric welding a longitudinal seam in a tubular blank, comprising means for supplying a welding current to the longitudinal edges of the blank to be welded, means for positioning the blank for welding, a plurality of cooperating pivotal clamping levers disposed on opposite sides of the blank, means for causing a movement of the pivotal points of said levers in paths perpendicular to a plane tangential to the wall of the blank opposite the welding cleft while maintaining said pivotal points a fixed distance apart, and means for causing a pivotal clamping action of said levers during said movement to move the edges of the blank toward each other to effect a welding thereof.

34. A machine for electric welding a longitudinal seam in a tubular blank, comprising means for supplying a welding current to the longitudinal edges of the blank to be welded, means for positioning the blank for welding, cooperating pivotal clamping levers disposed on opposite sides of the blank, the pivotal points of said levers being in the proximity of a plane tangential to the wall of the blank opposite the welding cleft, means for causing a limited movement of the pivotal points of said levers in paths perpendicular to said tangential plane while maintaining said pivotal points a fixed distance apart, and means for causing a pivotal clamping action of said levers during said movement to move the edges of the blank toward each other to effect a welding thereof.

35. A welding machine for electric welding a longitudinal seam in a tubular blank, comprising means for supplying a welding current to the longitudinal edges of the blank to be welded, cooperating pivotal clamping levers for moving the edges to be welded toward each other, the pivotal lines of the respective cooperating levers being located in a plane parallel to a plane tangential to the wall of the blank opposite the welding cleft; means for causing a relative perpendicular movement between the plane connecting the respective pivotal points and said tangential plane, and means operative during said relative movement to move the edges to be welded toward each other to effect a welding thereof.

36. A machine for welding a longitudinal seam in a tubular article, comprising electrodes extending on each side of the welding cleft, clamping members for clamping the longitudinal marginal edge portions of the blank to the electrodes, a stationary frame, levers for supporting certain of said clamping members disposed on opposite sides of the blank and movably connected to the frame, and means for operating the levers to move the edges relatively toward and away from each other.

37. A machine for welding a longitudinal seam in a tubular article, comprising a stationary element, electrodes extending on each side of the welding cleft, means for clamping the longitudinal marginal edge portions of the blank to the electrodes, said means including levers disposed on opposite sides of the blank and connected to said stationary element, and means for operating all of said levers to move the edges relatively toward and away from each other, said last named means including a main bell-crank lever, operating bars connected thereto and extending longitudinally of the machine and auxiliary bell-crank levers pivotally connected to the operating bars, to the stationary element and to the levers.

38. A machine for welding a longitudinal seam in a tubular article, comprising, electrodes extending on each side of the welding cleft, clamping members for clamping the longitudinal marginal edge portions of the blank to the electrodes, a stationary bed frame, levers for supporting certain of said clamping members disposed on opposite sides of the blank and linked to the bed frame, and means for operating the levers to move the edges relatively toward and away from each other, said last named means including a main bell-crank lever, operating bars connected thereto and extending longitudinally of the machine and auxiliary bell-crank levers pivotally connected to the operating bars, to the stationary bed frame and to the clamp supporting levers.

39. A machine for welding a longitudinal seam in a tubular article, comprising electrodes extending longitudinally of the blank on each side of the welding cleft, clamping members oppositely disposed from said electrodes, toggle means for moving said clamping members and said electrodes relatively toward and away from each other, additional clamping members adjacent the electrodes, and means for operating the last named clamping members to clamp the tubular blank and to move the edges thereof toward each other.

40. A machine for welding a longitudinal seam in a tubular article, comprising electrodes extending longitudinally of the blank and adapted to engage the walls thereof on each side of the welding cleft, clamping members arranged outside the blank and oppositely disposed from said electrodes, a longitudinally extending vertically movable beam, struts connecting said beam to said clamping members, toggle members for moving said beam, and means for moving the edges to be welded toward and away from each other.

41. A machine for welding a longitudinal seam in a tubular blank, comprising welding electrodes adapted to engage the marginal edge portion of the blank to be welded on each side of the welding cleft, clamping members adapted to engage the outer wall of the blank opposite the electrodes, a beam extending longitudinally of the machine, toggle means connecting said beam to said clamps, fluid pressure means for moving said beam to thereby move said clamps toward and away from said electrodes, and means for moving the electrodes with the respective edges clamped thereto toward and away from each other.

42. An apparatus for welding a longitudinal seam in a tubular article, comprising a stationary bed frame, levers linked to the bed frame and adapted to extend longitudinally of the blank to be welded on opposite sides thereof, electrodes connected to said levers and adapted to engage the walls of the blank adjacent the respective edges to be welded, clamping members secured to said levers and adapted to engage the walls of the blank adjacent the electrodes, clamping members movably mounted in said levers and adapted to cooperate with said electrodes to clamp the blank for welding, means for moving the last named clamping members independently of the movement of the levers to bring the tubular blank into clamping position, and means for operating the levers to clamp the blank and to move the edges to be welded relatively toward and away from each other.

43. An apparatus for welding a longitudinal seam in a tubular article, comprising a frame, levers linked to the frame and adapted to extend longitudinally of the blank to be welded on opposite sides thereof, electrodes connected to said levers and adapted to engage the walls of the blank adjacent the edges to be welded, clamping members secured to said levers and adapted to engage the walls of the blank adjacent the electrodes, clamping members movably mounted in said levers and adapted to cooperate with said electrodes to clamp the blank for welding, means for moving the last named clamping members independently of the movement of the levers to bring the tubular blank into clamping position, means for operating the levers to clamp the tubular blank and to move the edges to be welded relatively toward and away from each other, and means operative during movement of the levers to correctively vary the diameter of the blank extending from the welding cleft and thereby maintain said clamping members in contact with the blank for substantially the entire outer periphery thereof during the welding operation.

44. An apparatus for welding a longitudinal seam in a tubular article, comprising a frame, levers arranged on opposite sides of the blank, pivotal links connecting said levers to said frame, electrodes connected to said levers and adapted to engage the walls of the blank adjacent the edges to be welded, clamping dies secured to said levers and adapted to engage the walls of the blank adjacent the electrodes, clamping dies movably mounted between said levers and adapted to cooperate with said electrodes to clamp the blank for welding, a longitudinally extending beam, a plurality of longitudinally aligned pairs of transversely spaced toggles connecting said beam to the last named clamping dies, means for moving the beam to move said last named clamping dies and thereby bring the blank into position for welding, and means for operating the levers to clamp the tubular blank and to move the edges to be welded relatively toward and away from each other, said levers causing a movement of said toggles to correctively move said last named clamping dies during the welding operation.

45. An apparatus for electric welding a longitudinal seam in a tubular article, comprising a frame, levers arranged on opposite sides of the blank and movably connected to said frame, electrodes connected to said levers and adapted to engage the walls of the blank adjacent the respective edges to be welded, clamping dies movably mounted between said levers and adapted to cooperate with said electrodes to clamp the blank in position for welding, a plurality of toggle members supporting said clamping dies and arranged to cause a limited corrective movement of said clamping dies during movement of said levers, and means to operate said levers to clamp the blank and move the edges to be welded relatively toward each other.

46. A machine for welding a longitudinal seam in a tubular blank, comprising a frame, welding electrodes extending longitudinally of the blank to be welded on each side of the welding cleft, clamping levers linked to said frame and adapted to be disposed on opposite sides of the blank, clamping dies secured to said levers and adapted to engage the walls of the blank adjacent the electrodes, clamping dies disposed between the levers and adapted to cooperate with said electrodes to clamp the blank for welding, means for operating the last named dies to raise the tubular blank into clamping position, means to operate said levers to clamp the tubular blank to the electrodes and to move the edges to be welded relative to each other, and means operated by the movement of the levers to cause a relative corrective movement of the last named clamping dies and the first named clamping dies.

47. An apparatus for welding a longitudinal seam in a tubular blank, comprising electrodes adapted to engage the outer walls of the blank on opposite sides of the welding cleft, clamping members engaging the outer walls of the blank opposite said electrodes, means for moving the electrodes and the respective edges in contact therewith relatively toward each other, and means operated by the last named means to cause a movement of the clamping members relative to the electrodes to correctively vary the diameter of the blank extending away from the welding cleft.

48. A machine for welding a longitudinal seam in a tubular article, comprising electrodes adapted to engage the walls of the blank on opposite sides of the welding cleft, clamping members arranged outside the blank and oppositely disposed from said electrodes, and means for moving the edges to be welded and the electrodes in contact therewith relatively toward each other and at the same time causing a relative movement between the clamping members and electrodes.

49. A machine for welding a longitudinal seam in a tubular blank, comprising a frame, welding electrodes extending longitudinally of the blank to be welded on each side of the welding cleft, clamping levers linked to said frame and disposed longitudinally on opposite sides of the blank, clamping dies secured to said levers and adapted to engage the walls of the blank adjacent the electrodes, clamping dies arranged between the levers and adapted to cooperate with said electrodes to clamp the blank for welding, means for operating the last named dies to raise the tubular blank into clamping position, means to operate said levers to clamp the tubular blank to the electrodes and to move the edges to be welded relative to each other, means operated by the movement of the levers to cause a relative movement of the first named clamping dies and the last named clamping dies in a direction to correctively vary a diameter of the blank during the welding operation, and means for adjusting the amount of said corrective movement.

50. In a machine for welding a single longitudinal seam in a tubular article, comprising electrodes extending longitudinally of the blank on each side of the welding cleft, a plurality of dies adapted to surround the tubular blank, means for clamping the blank between the dies and the electrodes and to move the edges to be welded toward and away from each other to establish and maintain a flashing arc therebetween, and means tending to maintain substantially the entire outer periphery of the blank in uniform nonslipping contact with the die faces during the movement of the edges.

51. A machine for welding a longitudinal seam in a tubular article, comprising electrodes extending longitudinally of the blank and adapted to engage the walls thereof on each side of the welding cleft, clamping members, means for operating the clamping members to clamp the tubular blank to the electrodes and between the clamping members and to move the edges to be welded toward each other to effect a welding thereof, an arbor disposed within the tubular blank, a support attached to said arbor, and means for moving said support simultaneously with the movement of certain of said clamping members to position said arbor relative thereto.

52. In a machine for electric flash welding the full length of a longitudinal seam in a tubular blank simultaneously, an arbor adapted to support the blank against external pressures during the welding operation, said arbor comprising a base adapted to engage the inner wall of the blank opposite the edges to be welded, movable arms supported on the base and adapted to engage the inner wall of the blank beneath the welding electrodes, yieldable means disposed between the support and pivotal arms and means for limiting the movement of the arms.

53. In a machine for welding the full length of a longitudinal seam in a tubular blank simultaneously, an arbor disposed within the blank and adapted to support the same against external pressures during the welding operation, said arbor comprising a base adapted to engage the inner wall of the tubular blank opposite the edges to be welded, pivotal arms supported on the base and adapted to engage the inner wall of the tubular blank beneath the welding electrodes, resilient means disposed between the base and pivotal arms, and means tending to maintain the pivotal arms in a predetermined position.

54. In a machine for electric flash welding the full length of a longitudinal seam in a tubular blank simultaneously, an arbor adapted to be disposed within the blank to support the same against external pressures during the welding operation, said arbor comprising a base adapted to engage the inner wall of the blank on the side opposite the edges to be welded, resilient means resting upon said base, pivotal arms supported by said resilient means and adapted to contact with the walls of the blank directly beneath the electrodes, and shields for protecting the resilient means from metal flashed from the edges during the welding operation.

55. In a machine for flash welding a longitudinal seam in a tubular article, an arbor adapted to be disposed within the blank to be welded and support the same against external pressures during the welding operation, said arbor comprising a base adapted to engage the inner wall of the blank furtherest from the electrodes, pivotal arms supported by said base and adapted to engage the inner walls of the blank beneath the electrodes, an expansible hose disposed between the pivotal arms and the base, means for supplying fluid pressure to said hose, and means substantially enclosing the hose to protect the same from the metal flashed from the edges during the welding operation.

56. In a machine for welding a longitudinal seam in a tubular blank and having an arbor adapted to be disposed within the blank, of a support for said arbor disposed at one end of the machine, said support comprising a vertically movable tubular upright, a transversely extending arm connected to said upright, a vertically adjustable supporting member connected to the free end of said arm, an arbor supporting bracket secured to the lower end of said last named member, means for maintaining said supporting member in predetermined position, and means for supplying fluid pressure through said arbor support and to said arbor.

57. In a machine for welding the full length of a longitudinal seam in a tubular blank simultaneously, an arbor disposed within the blank and adapted to support the same against the pressures of the welding electrodes during the welding operation, said arbor comprising a plurality of longitudinally aligned shoes engaging the inner wall of the blank opposite the edges to be welded, longitudinally extending superimposed laminations of magnetic material supported on said shoes, an expansible hose supported on said laminations, a longitudinally extending plate supported on the hose, flanges connected to the margins of said plate extending on opposite sides of the hose, a plurality of superimposed laminations of magnetic material connected to said flanges, oppositely bowed arms pivotally connected to the plate, contacting blocks connected to the outer ends of the arms and adapted to engage the inner wall of the tubular blank beneath the welding electrodes, a trough extending longitudinally of the blank and supported in the recess formed by the bowed portions of the pivotal arms, resilient means connected to the pivotal arms for limiting the outward pivotal movement of the arms, resilient means operatively associated with the downwardly extending flanges for maintaining the arms in a predetermined movable position, and means for applying fluid pressure to the hose to expand and contract the arbor.

58. In a machine for welding longitudinal seams to unite the edges of tubular blanks, in combination, dies for engaging the walls of a blank substantially throughout its circumference, and means for actuating the dies to feed the edges of a blank toward one another, the die actuating means being disposed to give the dies a winding movement from a predetermined line in the blank to effect a feeding movement of the edges with substantially no sliding movement between the dies and the blank.

59. In a machine for welding longitudinal seams to unite the edges of tubular blanks, in combination, a resilient arbor for supporting the walls of a blank, dies for engaging the blank substantially throughout its circumference, means for actuating the dies to cooperate with the arbor in feeding the edges of the blank toward one another, the die actuating means being disposed to give the dies a winding movement about the arbor from a predetermined line in the blank to effect a feeding movement of the edges with substantially no sliding movement between the dies and blank.

60. A machine for welding longitudinal seams to unite the edges of tubular blanks, comprising electrodes disposed to engage the edges of a blank to supply current for performing welding operations, dies for engaging the blank substantially throughout its circumference, means for actuating the dies to feed the edges of the blank toward one another cooperative to establish an arc, the die actuating means being disposed to give the dies a winding movement from a predetermined line in the blank to effect a feeding movement of the blank with substantially no sliding movement between the dies and the blank, the speed of the die actuating means being regulated to cause a feeding of the edges at a speed which will maintain a gap between the edges during the first part of the welding operation and to press the edges into engagement during the last part of the welding operation.

61. In a machine for flash welding longitudinal seams to unite the edges of tubular blanks, in combination, a plurality of dies for receiving opposed sections of a tubular blank, the dies substantially enclosing the blank sections, and means for actuating the dies to feed the edges of the blank to perform welding operations, the die actuating means being disposed to give the dies engaging the opposed sections of the blank movements which conform to the movements of the blank sections as they are fed to the arc, thereby to support the blank sections continuously.

62. In a machine for flash welding longitudinal seams to unite the edges of tubular blanks, in combination, dies for receiving opposed sections of a blank, and means for actuating the dies, the die actuating means being disposed to give the dies carrying one section of the blank a pivotal movement to effect the feeding of an edge of the blank to the flashing arc and to move the dies supporting said section relative to one another to compensate for the decrease in peripheral length of the blank section during the welding operation.

63. In a machine for flash welding longitudinal seams to unite the edges of tubular blanks, in combination, a plurality of dies for receiving opposed sections of a tubular blank, means cooperative to retain the blank sections in position in the dies, means for actuating the dies to give them a pivotal movement about a line extending between the dies carrying the opposed sections of the blank to feed the edges of the blank to the arc, and means for moving the dies relative to one another to compensate for the decrease in peripheral length of the blank sections.

64. A welding machine for use in the manufacture of a tubular article having a longitudinal welded seam comprising means for supplying a welding current to the edges of the tubular blank to be welded, means for engaging the opposite halves of the blank, and means for actuating the blank engaging means, said blank engaging means being disposed to carry an edge of the blank inwardly while the lower portion of the corresponding half of the blank remains substantially stationary, thereby giving the half of the blank a movement simulating a pivotal movement.

65. A welding machine for use in the manufacture of a tubular article having a longitudinal weld of substantial length, comprising means for supplying a welding current simultaneously to the full length of the longitudinal edges to be welded, and die members operable to move both of the edges of the tubular blank toward each other in curved paths having a radius approximating the diameter of the tubular blank to thereby maintain a flashing arc between the edges and to finally bring the edges into welding engagement.

In witness whereof we have signed our names at Milwaukee, Wisconsin, this 21st day of June, 1930.

ERIC NILSON.
SVEN MALKE.
EINAR O. HOLMBERG.